United States Patent
Yamamoto

(10) Patent No.: US 7,580,140 B2
(45) Date of Patent: Aug. 25, 2009

(54) PRINTING SYSTEM

(75) Inventor: Kazuya Yamamoto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 800 days.

(21) Appl. No.: 11/344,022

(22) Filed: Jan. 31, 2006

(65) Prior Publication Data

US 2006/0170949 A1    Aug. 3, 2006

(30) Foreign Application Priority Data

Feb. 1, 2005   (JP)   ............... 2005-024657

(51) Int. Cl.
  *G06K 15/00* (2006.01)
(52) U.S. Cl. ............. 358/1.13; 358/1.15; 358/1.18
(58) Field of Classification Search ......... 358/1.12, 358/1.13, 1.15, 2.1, 1.9, 1.18, 471, 400, 401
  See application file for complete search history.

(56) References Cited

U.S. PATENT DOCUMENTS 5,500,700 A * 3/1996 Massarsky .............. 396/2
2004/0160875 A1* 8/2004 Sasaki .................. 369/53.15
2004/0257618 A1* 12/2004 Wang ..................... 358/1.17
2006/0165257 A1* 7/2006 Yamaguchi et al. ........ 382/100
2006/0170949 A1* 8/2006 Yamamoto .............. 358/1.13
2007/0136213 A1* 6/2007 Sansone et al. .......... 705/401
2007/0146829 A9* 6/2007 Coons et al. ............ 358/504

FOREIGN PATENT DOCUMENTS

JP        2001-277672 A    10/2001

* cited by examiner

*Primary Examiner*—Jerome Grant, II
(74) *Attorney, Agent, or Firm*—Panitch Schwarze Belisario & Nadel LLP

(57) ABSTRACT

A printing system is provided capable of preventing unnecessary image information from being sent. The printing system is formed by an image processing apparatus to generate print data and an image forming apparatus to receive the print data and to execute a print. In the printing system, the image forming apparatus includes an image forming; a print mode discriminating section; a confirmation result inputting section; and a request informing section. The image processing apparatus includes a print data generating section; and a selecting and outputting section.

15 Claims, 20 Drawing Sheets

| PAGE NUMBER | EXISTENCE/INEXISTENCE OF CONFIRMATION PRINT DESIGNATION |
|---|---|
| 1 | INEXISTENCE |
| 2 | INEXISTENCE |
| 3 | EXISTENCE |
| 4 | INEXISTENCE |
| 5 | EXISTENCE |
| 6 | EXISTENCE |
| 7 | INEXISTENCE |
| 8 | INEXISTENCE |
| 9 | INEXISTENCE |
| 10 | EXISTENCE |

PRINTING SYSTEM

BACKGROUND OF THE INVENTION

1. Field of the Invention

The invention relates to a printing system.

2. Related Background Art

Conventionally, in the case to print an image which is made by that user operates a host computer, by a printer, in order to confirm whether the image is formed by a desired coloring and density, that is, in order to confirm a state of print result, before to print all of the made image, it is possible to execute a confirmation print to print an image of an optional part such as an optional page, then, on the basis of the image printed for confirmation, after user judged the print result, a print of the remaining image is performed.

A printing system providing such art is proposed in a patent document, for example, the Japanese patent publication 2001-277672.

However, in such conventional printing system, even if the confirmation print is executed, because all image of print data is sent to the printer form the host computer, when the user judges the result of the confirmation print and stops the print, all of the print data sent to the printer becomes useless.

Also, because a transmission regarding unnecessary print data in pages except the page to be confirmed by the user is executed, the time to that the user can obtain the result of the conformation print become long.

SUMMARY OF THE INVENTION

It is, therefore, an object of the invention to provide a printing system capable of solving the above stated problem. In the printing system, an image processing apparatus only sends image information in range designated for confirmation print use to an image forming apparatus, after a request with respect to the remaining image information is sent from the image forming apparatus to the image processing apparatus, based on a result of confirmation result, the remaining image information in the remaining range is sent from the image processing to the image forming apparatus. Thus, a transmission of unnecessary data does not need to execute, a confirmation print can be performed in a short time, and image information sent to the image forming apparatus does not become useless.

According to the present invention, there is provided a printing system which is formed by a image processing apparatus to generate print data and a image forming apparatus to be connected with the image processing apparatus, to receive the print data and to execute a print, and prints a part of the print data before printing the print data of predetermined unit, comprising:

wherein the image forming apparatus includes an image forming section which form an image on the basis of the print data received from the image processing apparatus;

a print mode discriminating section which discriminates whether the received print data is image confirmation use data;

a confirmation result inputting section which inputs a confirmation result of the image when the discriminated result of the print mode discriminating section is the image confirmation use data; and a request informing section which requests the image process to output the print data to correspond to the inputted confirmation result in the confirmation result inputting section;

wherein the image processing apparatus includes a print data generating section to generate print data of predetermined unit;

a print data storing section to store the generated print data; and a selecting and outputting section to select a data range for the image confirmation and output the data of the data range;

wherein after the image confirmation use data is outputted to the image forming apparatus, when an output of the print data corresponding to the image confirmation use data is requested from the image forming apparatus, the selecting and outputting section selects print data except the data range for image confirmation use from the print data of predetermined unit stored in the print data storing section, and outputs the selected print data.

Further, according to the present invention, there is also provided a printing system which is formed by a image processing apparatus to generate print data and a image forming apparatus to be connected with the image processing apparatus, to receive the print data and to execute a print, and prints a part of the print data before printing the print data of predetermined unit, comprising:

wherein the image forming apparatus includes an image forming section which form an image on the basis of the print data received from the image processing apparatus;

a print mode discriminating section which discriminates whether the received print data is image confirmation use data;

a confirmation result inputting section which inputs a confirmation result of the image when the discriminated result of the print mode discriminating section is the image confirmation use data; and a request informing section which requests the image process to output the print data to correspond to the inputted confirmation result in the confirmation result inputting section;

wherein the image processing apparatus includes a print data generating section to generate print data of predetermined unit;

a print data storing section to store the generated print data; and a selecting and outputting section to select a data range for the image confirmation and output the data of the data range;

wherein after the image confirmation use data is outputted to the image forming apparatus, when an output of the print data corresponding to the image confirmation use data is requested from the image forming apparatus, the selecting and outputting section outputs the print data of predetermined unit stored in the print data storing section.

Moreover, in the above printing systems, when the image forming apparatus is inputted a confirmation result indicating the formed image is not suitable through the confirmation result inputting section, the request informing section requests to stop the output of the print data with respect to the image processing apparatus, the image processing apparatus, when being requested to stop the output of the print data by the request informing section, deletes print data of predetermined unit stored in the print data storing section.

Moreover, in the above printing systems, after the image forming apparatus printed the image confirmation use data, if the input of the confirmation result does not executed in the confirmation result inputting section over a predetermined time, the request informing section requests to stop the output of the print data with respect to the image processing apparatus.

Moreover, in the above printing systems, after the image forming apparatus printed the image confirmation use data, if the input of the confirmation result does not executed in the confirmation result inputting section over a predetermined time, the request informing section requests a confirmation input of the print data with respect to the image processing apparatus.

Moreover, in the above printing systems, the image generating section, before generating the print data of the predetermined unit, generates print data in the data range for the image confirmation use.

Moreover, in the above printing systems, the image forming apparatus further includes a data storing section to store the image confirmation use data; and a print data selecting section to select one from the image confirmation use data stored in the data storing section and the print data outputted by the image processing apparatus based on an output request of print data requested by the request informing section according to the page order of the print data of the predetermined unit, wherein according to the page order, the image formation is performed.

Moreover, in the above printing systems, the image forming apparatus further includes a data storing section to store the image confirmation use data; and a print data selecting section to select one from the image confirmation use data stored in the data storing section and the print data outputted by the image processing apparatus based on an output request of print data requested by the request informing section according to the page order of the print data of the predetermined unit, wherein according to the page order, the image formation is performed.

Moreover, in the above printing systems, the image forming apparatus further includes a first sheet providing tray to accommodate record medium for forming image provided to the image forming section; a second sheet providing tray to accommodate medium for executing a print based on the image confirmation use data; a stacker to stack the record medium of the first sheet providing tray and the second sheet providing tray; an outputting section to output the record medium of the first sheet providing tray or the second sheet providing tray to the stacker; and a tray selecting section to select the record medium outputted by the outputting section whether from the first sheet providing tray or the second sheet providing tray, the tray selecting section executes a selection so as to output the record medium according to a page order of the print data of the predetermined unit.

Moreover, in the above printing systems, the image forming apparatus further includes a confirmation data setting section to set a data range for image conformation use in the print data of predetermined unit stored in the print data storing section.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to the drawings.

Embodiment 1

Figure 1:
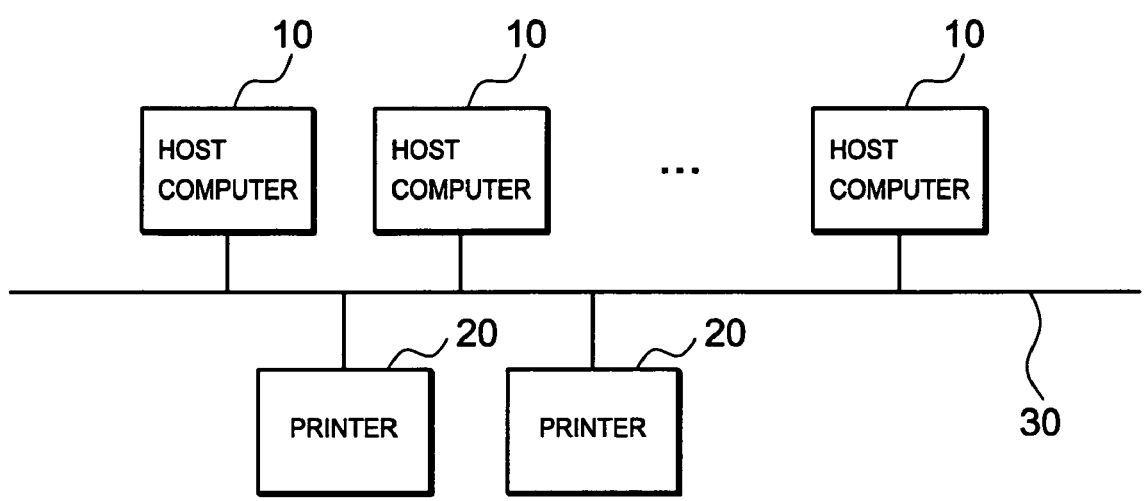
FIG. 1 is a block diagram showing structure of a printing system according to embodiment 1.

FIG. 1 is a block diagram showing structure of a printing system according to embodiment 1.

As shown by FIG. 1, a printing system in the embodiment comprises a host computer 10 as an image processing apparatus, and a printer 20 as an image forming apparatus. The host computer 10 and the printer 20 are connected via a communication line 30.

Here, the host computer 10 is a computer including a calculating means such as CPU, MPU or the like; a storing means such as magnetic disk, semiconductor memory or the like; a inputting means such as keyboard, mouse, touch panel or the like; a displaying means such as CRT, liquid crystal or the like; a communication interface and the like. Serving as an apparatus capable of making an image to be printed in printer 20, the host computer 10 may be a personal computer, a server, a PDA (Personal Digital Assistant), an electronic handbook, or a game device; and also may be any kinds of apparatuses.

Further, the printer 20, serving as an apparatus capable of printing image information received from the host computer 10 onto print paper as record medium, may be any of inkjet type, electrophotography type, heat transcription type and the like; and also may be color printer, or monochrome printer; further may be a multiple apparatus together having functions of printer, facsimile apparatus and copy apparatus.

Furthermore, the communication line 30 may be cable such as USB (Universal Serial Bus) cable or the like; also may be network such as intra-net, LAN (Local Area Network), WAN (Wide Area Network) or the like; and also may be IP (Internet Protocol) containing internet.

Moreover, in the embodiment, as shown by FIG. 1, the host computer 10 and the printer 20 respectively connected with the communication line 30 may be singular, also may be plural. When it is plural, the number may be optional.

Next is to explain the host computer 10.

Figure 2:
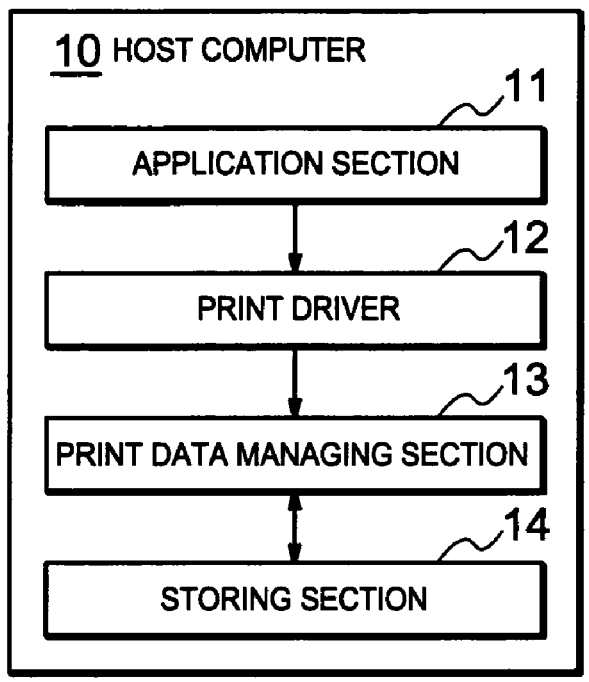
FIG. 2 is a block diagram showing structure of a host computer in embodiment 1.
Figure 3:
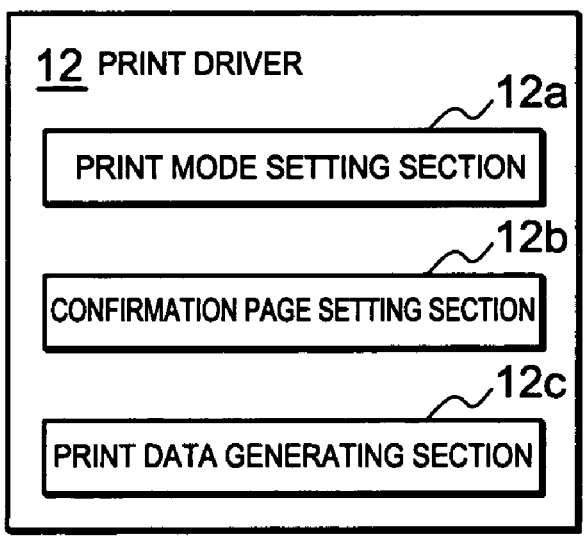
FIG. 3 is a block diagram showing structure of a print driver in embodiment 1.
Figure 4:
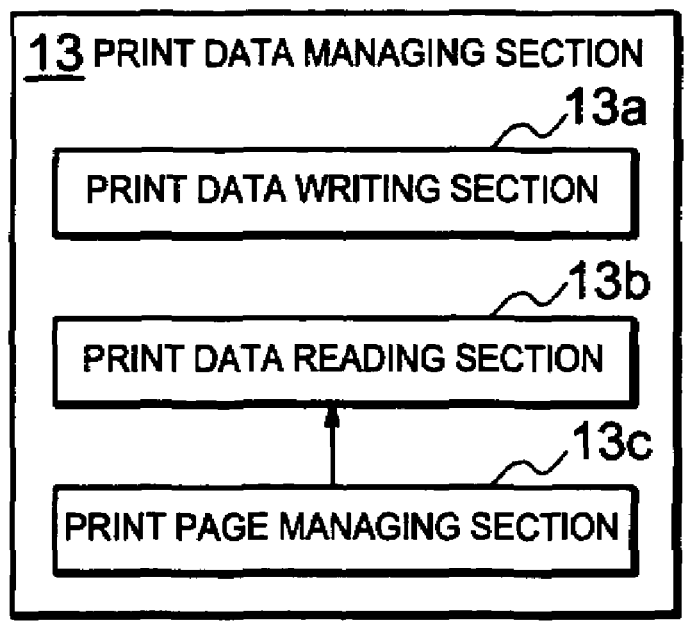
FIG. 4 is a block diagram showing structure of a print data managing section in embodiment 1.
Figure 5:
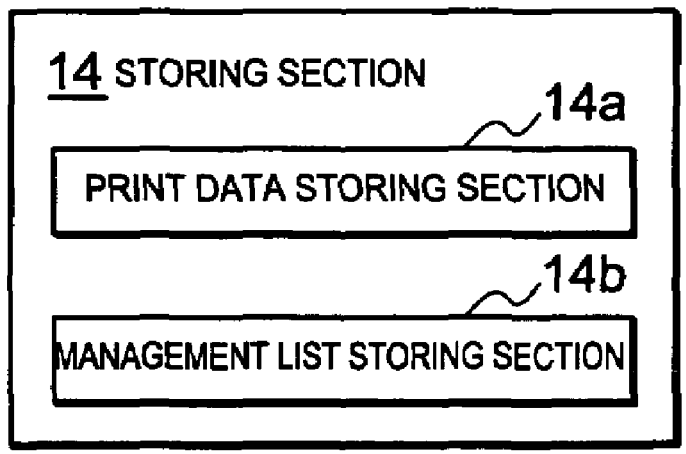
FIG. 5 is a block diagram showing structure of a storing section in embodiment 1.
Figures 6, 7:
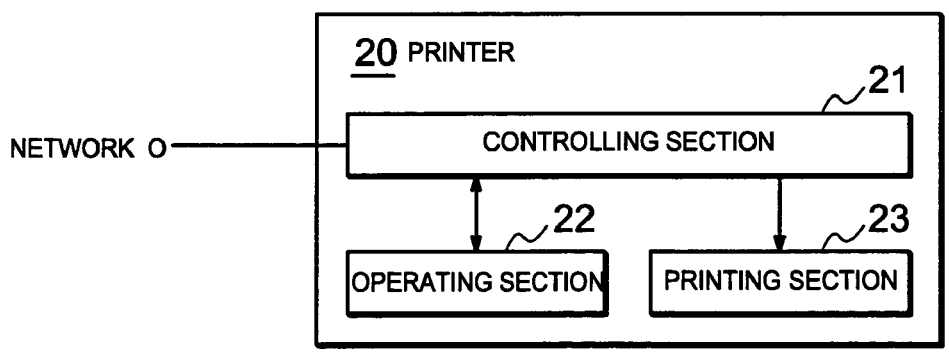
FIG. 6 is a diagram showing structure of a print data management list in embodiment 1.
FIG. 7 is a block diagram showing structure of a printer in embodiment 1.

FIG. 2 is a block diagram showing structure of a host computer in embodiment 1; FIG. 3 is a block diagram showing structure of a print driver in embodiment 1; FIG. 4 is a block diagram showing structure of a print data managing section in embodiment 1; FIG. 5 is a block diagram showing structure of a storing section in embodiment 1; and FIG. 6 is a diagram showing structure of a print data management list in embodiment 1.

As shown by FIG. 2, according to every functions, the host computer 10 includes an application section 11 to make an image to be printed by the printer 20; a print driver 12 which changes the image made in the application section 11 into data capable of being printed in the printer 20, and generates print data as image information; a print data managing section 13 which executes storing process to store the print data generated in the print driver 12 into storing section, output process to read out the stored print data and to output it to the printer 20; and a storing section 14 which stores the print data generated in the print driver 12, and stores a management list generated in the print data managing section 13.

The application section 11 has an application generally being software such word process software, drawing software or the like.

Further, the print driver 12, as shown by FIG. 3, has a print mode setting section 12a to set print mode; a confirmation page setting section 12b serving as confirmation print range designating section to set an optional page for executing a confirmation print when a confirmation print mode is set in the print mode setting section 12a; and a print data generating section 12c serving as an image information generating section to generate print data with predetermined unit from the image made in the application section 11 when there is a print request from the application section 11. In the print mode setting section 12a, in the case to execute the confirmation print of the image made in the application section 11, the confirmation print mode is set; and in the case not to execute the confirmation print, a normal mode is set.

Further, the print data managing section 13, as shown by FIG. 4, has a print data writing section 13a to write the print data into a print data storing section 14a stated below whenever the print data is generated by the print data generating section 12c; a print data reading section 13b to read out the print data written in the print data storing section 14a stated below according to an instruction of a print page managing section 13c and to output it to the printer 20; and the print page managing section 13c serving as a selection outputting means to judge the print data according to the print mode set by the print mode setting section 12a, and to send an instruction according to a judged result to make the print data reading section 13b read out the print data and output the print data to the printer 20.

The print page managing section 13c, when the print mode set by the print mode setting section 12a is the confirmation print mode, as shown by FIG. 6, make a management list to indicate whether there is a confirmation print designation with respect to respective pages of print data.

Furthermore, the storing section 14, as shown by FIG. 5, has a print data storing section 14a as an image information storing section to store print data generated by the print data generating section 12c; and a management list storing section 14b to store the management list generated by the print page managing section 13c.

Next is the explanation regarding the printer 20.

Figure 8:
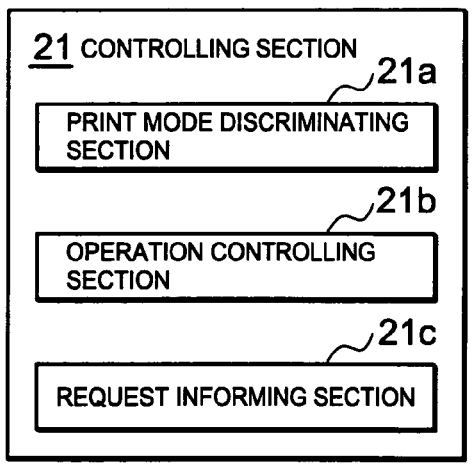
FIG. 8 is a block diagram showing structure of a controlling section in embodiment 1.

FIG. 7 is a block diagram showing structure of a printer in embodiment 1; FIG. 8 is a block diagram showing structure of a controlling section in embodiment 1; and FIG. 9 is a block diagram showing structure of an operating section in embodiment 1.

As shown by FIG. 7, the printer 20 has a controlling section 21 to control the printer 20; a operating section 22 being as an interface with user; and a printing section 23 serving as an image forming section to receive print data outputted from the host computer 10 and to print the print data.

The controlling section 21, as shown by FIG. 8, has a print mode discriminating section 21a to discriminate print mode of the received print data; a operation controlling section 21b to executing a control of the operating section 22; and a request informing section 21c which, in the case that the discriminated result in the print mode discriminating section 21a is a confirmation print mode and when a print result is confirmed by user and the print result is inputted into a confirmation result inputting section 22b mentioned below of the operating section 22, serves as a request means to inform the host computer 10 of the contents of the inputted print result.

Figure 9:
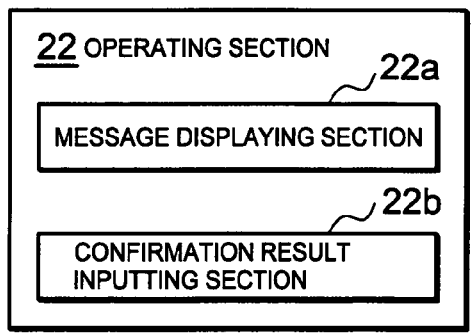
FIG. 9 is a block diagram showing structure of an operating section in embodiment 1.

Further, the operating section 22 has a message displaying section 22a which, as shown by FIG. 9, in the case that the discriminated result in the print mode discriminating section 21a is a confirmation print mode and when a print in printing section 23 ended, displays a message to user in order to obtain an input of OK/NG about the print result, according to an instruction of the operation controlling section 21b; and a confirmation result inputting section 22b which, in the case that the discriminated result in the print mode discriminating section 21a is a confirmation print mode, serves as a confirmation result setting means to make user confirm the print result, judge whether the print result is fine, and input a judgment result.

Next is to explain operations of the print system comprising the above structure. Firstly, print data generation process performed by the print driver 12 of the host computer 10 will be explained.

Figure 10:
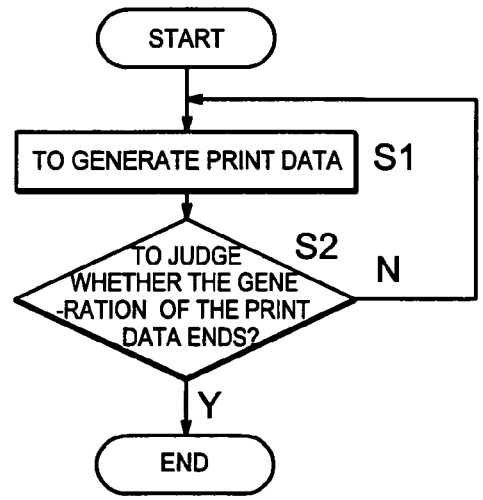
FIG. 10 is a flowchart showing operations of print data generation process in embodiment 1.

FIG. 10 is a flowchart showing operations of print data generation process in embodiment 1.

First, when an image is made in the application section 11 and a print request occurs, the print data generating section 12c sequentially changes the image made by the application section 11 into data capable of being printed by the printer 20, and generates print data.

Then, the print driver 12, whenever the print data is generated, judges whether all of the image made by the application section 11 have been changed into the print data, that is, to judges whether the generation of the print data has ended. Further, in the case that the all of the image is not yet completely changed into the print data, the print data generating section 12c is to continuously generate print data; in the case that all of the print data is changed, the print data generating section 12c ends the print data generation process.

Next is to explain the flowchart.

Step S1: to generate print data;

Step S2: to judge whether the generation of the print data ends, if the generation of the print data ended, to end the process; and if the generation of the print data does not yet end, to return to the step S1.

Next is to explain operations of print data output process.

Figure 11:
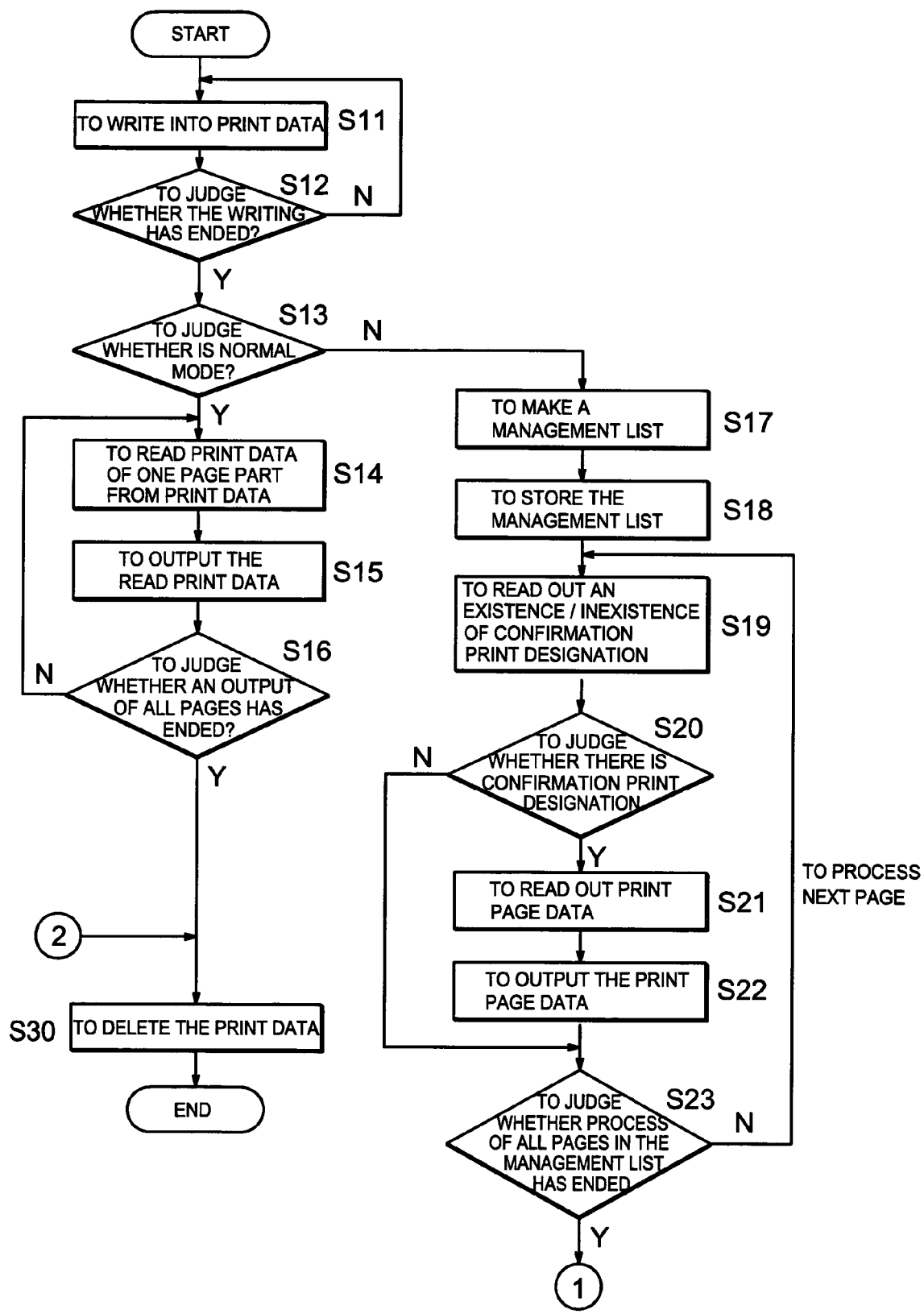
FIG. 11 is a first flowchart showing operations of print data output process in embodiment 1.
Figure 12:
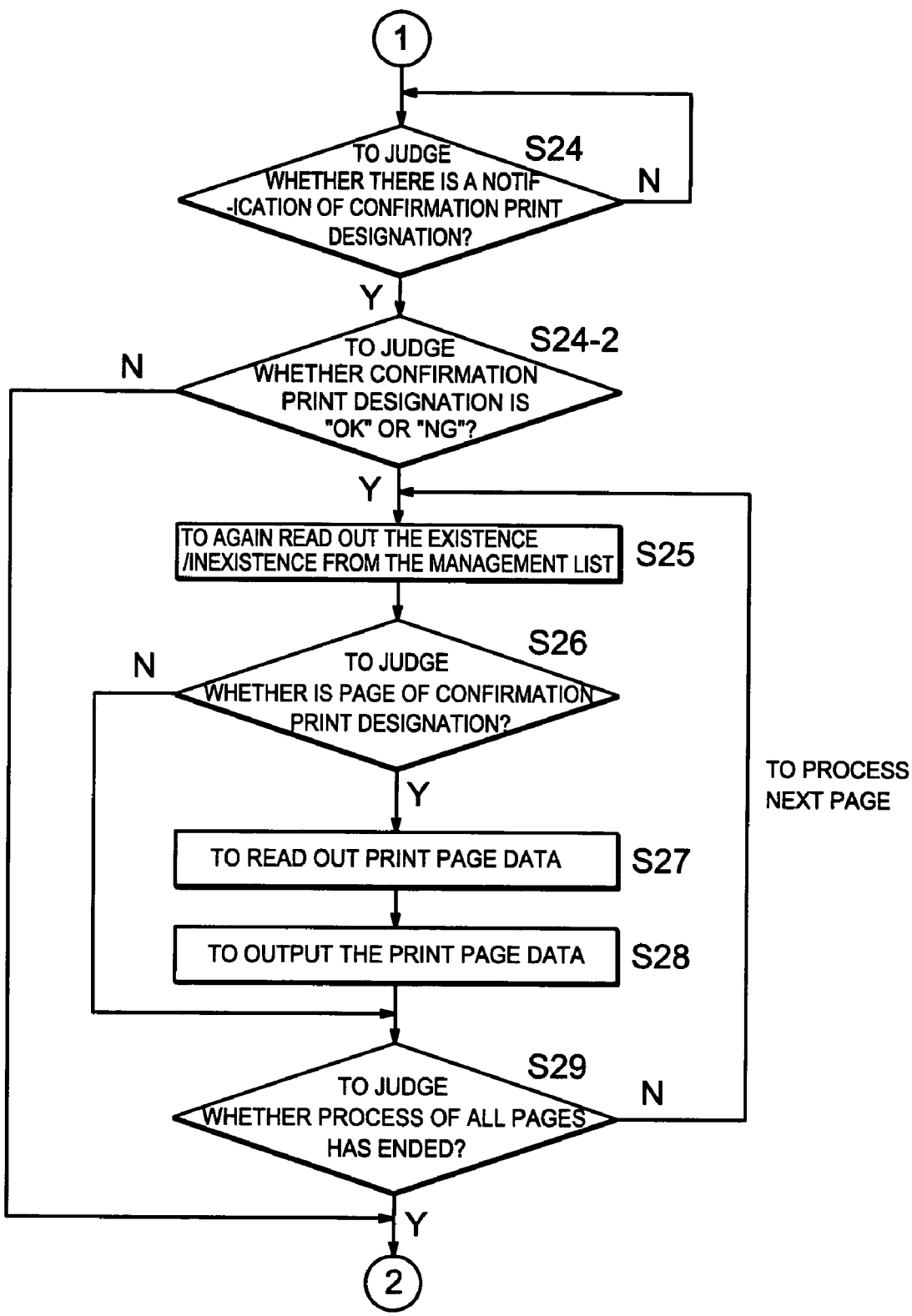
FIG. 12 is a second flowchart showing operations of print data output process in embodiment 1.

FIG. 11 is a first flowchart showing operations of print data output process in embodiment 1; and FIG. 12 is a second flowchart showing operations of print data output process in embodiment 1.

Firstly, whenever the print data is generated in the print data generating section 12c, the print data writing section 13a writes the generated print data into the print data storing section 14a.

Then, the print data managing section 13, whenever the print data writing section 13a writes the generated print data into the print data storing section 14a, judges whether the writing of the print data of all of the image ends. In the case that the writing of the print data of all of the image ended, the print data managing section 13 distinguishes the content of the print mode setting section 12a, and judges whether is normal mode. Further, if the print mode is normal mode, the print page managing section 13c instructs the print data reading section 13b to sequentially read out the print data stored in the print data storing section 14a from first page and to output the print data to the printer 20. Then, according to such instruction, the print data reading section 13b reads out the print data stored from the print data storing section 14a and outputs the print data to the printer 20.

Continuously, the print data managing section 13, whenever the print data is outputted into the printer 20, judges whether all of the print data has been outputted. In the case that the output of the all of the print data ended, the print data managing section 13 deletes the print data stored in the print data storing section 14a and ends the output of the print data.

Further, in the case that the print data managing section 13 judges whether the print mode is normal mode and the print mode is set in a confirmation print mode but is not a normal mode, the print page managing section 13c makes a management list, and stores the made management list into the management list storing section 14b. Then, the print page managing section 13c executes a reading of the management list, and sequentially reads an EXISTENCE/INEXISTENCE of the confirmation print designation of the print data out of the management from first page, further judges whether the confirmation print designation is provided. When one page having the conformation print designation is detected, the print page managing section 13c instructs the print data reading section 13b to read out the print data in the one page from the print data storing section 14a and to output the print data to the printer 20. Then, according to such instruction, the print data reading section 13b reads out the print data from the print data storing section 14a and outputs the print data to the printer 20.

Furthermore, the print data managing section 13, whenever the print data is outputted to the printer 20, judges whether an output of print data of all pages in that the confirmation print designation is respectively provided ends. In the case that the output of print data of all pages in that the confirmation print designation is respectively provided ended, the print data managing section 13 waits to be informed of a confirmation print result by the printer 20. Then, when the confirmation print result is informed from the printer 20, the print page managing section 13c sequentially reads the EXISTENCE/INEXISTENCE of the confirmation print designation of the print data out of the management list from first page, and judges whether the confirmation print designation is provided.

Continuously, when such page having no confirmation print designation is detected, the print page managing section 13c instructs the print data reading section 13b to read out the print data of the page from the print data storing section 14a and to output the print data to the printer 20. According to such instruction, the print data reading section 13b reads out the print data from the print data storing section 14a and outputs the print data to the printer 20.

Then, the print data managing section 13, whenever the print data is outputted into the printer 20, judges whether an output of the print data of all pages having no confirmation print designation has ended. In the case that the output of the print data of all pages having no confirmation print designation has ended, the print data managing section 13 deletes the print data stored in the print data storing section 14a and ends the output of the print data.

Moreover, in the embodiment, when there is a notification of the confirmation print result is sent from the printer 20, the print data of the page in which the confirmation print designation is not provided is sent to the printer 20. However, it is also possible to output all print data containing pages in which the confirmation print designation is provided.

Next is to explain the flowcharts.

Step S11: to write into print data.

Step S12: to judge whether the writing has ended. If the writing has ended, to enter step S13; if the writing has not yet ended, to return to the step S11.

Step S13: to judge whether is normal mode. If it is normal mode, to enter step S14; if it is not normal mode, to enter step S17.

Step S14: to read print data of one page part from print data.

Step S15: to output the read print data.

Step S16: to judge whether an output of all pages has ended. If the output has ended, to enter step S30; if the output has not ended, to return to the step S14.

Step S17: to make a management list.

Step S18: to store the management list.

Step S19: to read out an EXISTENCE/INEXISTENCE of confirmation print designation according to page order in the management list.

Step S20: to sequentially judge whether there is confirmation print designation. If there is the confirmation print designation, to enter step S21; if there is not the confirmation print designation, to return to the step S19.

Step S21: to read out print page data according to process order.

Step S22: to output the print page data according to process order.

Step S23: to judge whether process of all pages in the management list has ended. If the process has ended, to enter step S24; if the process has not ended, to return to the step S19.

Step S24: to judge whether there is a notification of the confirmation print designation. If there is the notification of the confirmation print designation, to enter step S24-2; if there is not the notification of the confirmation print designation, to stand by. Further, in the case that there is not the notification of the confirmation print designation after a predetermined time, to inform user of the state as a no notification.

Step S24-2: in the case the content of the notification of the confirmation print designation is "OK", to enter step S25; in the case the content of the notification of the confirmation print designation is "NG", to enter step S30 from 2.

Step S25: to again read out the EXISTENCE/INEXISTENCE of the confirmation print designation according to page order in the management list from the management list.

Step S26: to judge whether is page of the confirmation print designation. If it is the page of the confirmation print designation, to enter step S29, if it is not the page of the confirmation print designation, to enter step S27.

Step S27: to read out print page data according to process order.

Step S28: to output the print page data according to process order.

Step S29: to judge whether process of all pages in the management list has ended. If the process has ended, to enter step S30; if the process has not yet ended, to return to the step S25.

Step S30: to delete the print data and to end the process.

Next is to explain operations of the printer 20.

Figure 13:
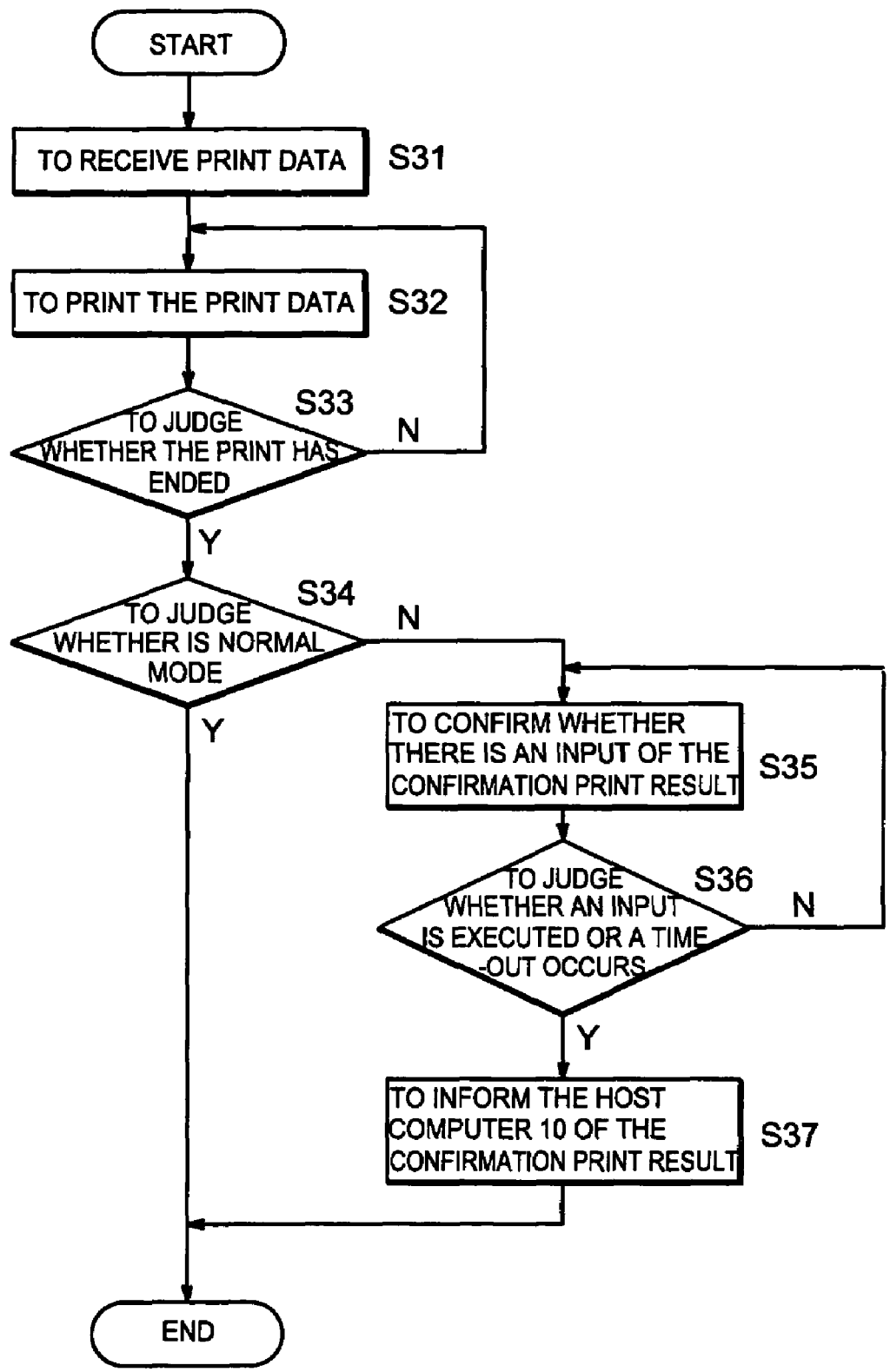
FIG. 13 is a flowchart showing operations of a printer in embodiment 1.

FIG. 13 is a flowchart showing operations of a printer in embodiment 1.

Firstly, the printer 20, when received print data from the host computer 10, sequentially prints the received print data. Then, the controlling section 21 discriminates whether the print of the received all print data has ended. If the print of the received all print data has ended, the controlling section 21 repeats the discrimination operation mentioned above till the received all print data is completely printed; If the print of the received all print data has not yet ended, the print mode discriminating section 21a discriminates print mode of the print data having been printed, and judges whether is normal mode.

In the case that the print mode is normal mode, the printer 20 ends the print process. Further, in the case that the print mode is not normal mode, but is confirmation print mode, the operation controlling section 21b instructs the message displaying section 22a to display a message to request an input of confirmation print result with respect to user. Then, according to such instruction, the message displaying section 22a displays the message, the printer 20 waits the user to input a confirmation print result into the confirmation result inputting section 22b.

Next, the operation controlling section 21b monitors a input state of the confirmation result inputting section 22b, judges whether there is an input. When there is an input, the request informing section 21c informs the host computer 10 of the inputted content of in the confirmation result inputting section 22b, that is, OK/NG of the confirmation print result. Then, whenever receiving the print data from the host computer 10, these operation stated above are repeated.

Moreover, in the embodiment, when the user inputs the confirmation print result into the confirmation result inputting section 22b, a confirmation print result information is informed to the host computer 10. However, in the case that the printer 20 measures the time, and there is not an input of the confirmation print result from the user even if predetermined time is over, it is possible to inform a result "NG" to the host computer 10.

Further, in the case that there is not an input of the confirmation print result from the user even if predetermined time is over, it is possible not only to send the host computer 10 a notification indicating the content having no input of the confirmation print result, but also to inform user of the state by the host computer 10. Then, the host computer 10 may delete the print data after informed the user. Further, the host computer 10 may also intactly store the print data, when is informed of "OK" of the confirmation print result from the printer 20, sends print data except the confirmation use print data or all print data.

Next is to explain the flowchart.

Step S31: to receive print data.

Step S32: to print the print data.

Step S33: to judge whether the print has ended. If the print has ended, to enter step S34; if the print has not yet ended, to return to the step S32.

Step S34: to judge whether is normal mode. If it is normal mode, to end the process; if it is not normal mode, to enter step S35.

Step S35: to confirm whether there is an input of the confirmation print result by the user. The user may inputs an OK/NG of the confirmation print result from the operating section 22.

Step S36: if the input of the confirmation print result is executed by the user, to enter step S37. Further, in the case that there is not the input after a predetermined time, with entering step S35 and the confirmation print result serves as NG, the message displaying section 22a of the operating section 22 informs user of the thing that the confirmation print becomes time-out.

Step S37: to inform the host computer 10 of the confirmation print result and to end the process.

As stated above, in the embodiment, when executing a confirmation print and the user designates a page to need confirmation print, only the print data of the page to need confirmation print is sent from the host computer 10 to the printer 20. Therefore, it is possible to reduce the print data amount to be outputted to the printer 20 while the confirmation print, and it is possible to short the sending time from the host computer 10 to the printer 20.

Further, because the time till to print the page to need confirmation print can be shorted in the printer 20, it is possible to short the time till to make the user execute a confirmation print and to obtain a confirmation print result of the page to need confirmation print.

Next, an embodiment 2 of the present invention will be explained. Moreover, in the embodiment 2, regarding the same compositions, they will be granted the same symbols, and the same explanations will be omitted. Further, regarding the same operations and the same effects as that in the embodiment 1, they will also be omitted.

Figure 14:
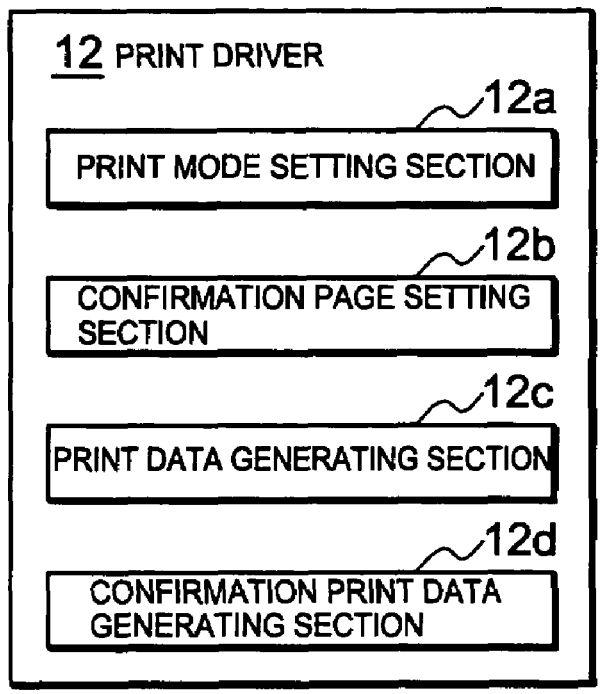
FIG. 14 is a block diagram showing structure of a print driver in embodiment 2.
Figure 15:
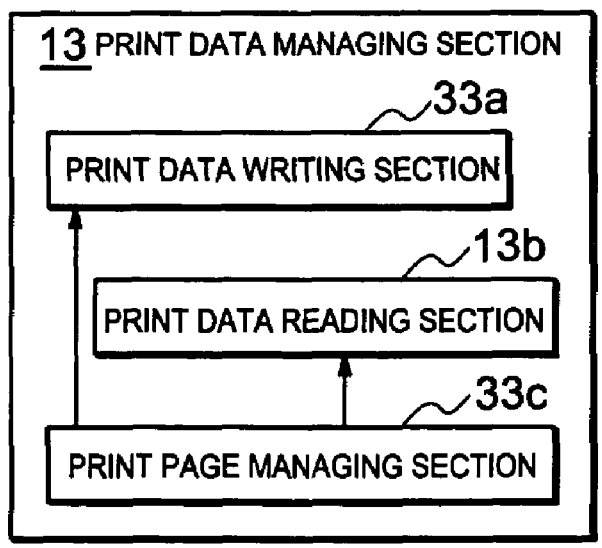
FIG. 15 is a block diagram showing structure of a print data managing section in embodiment 2.
Figure 16:
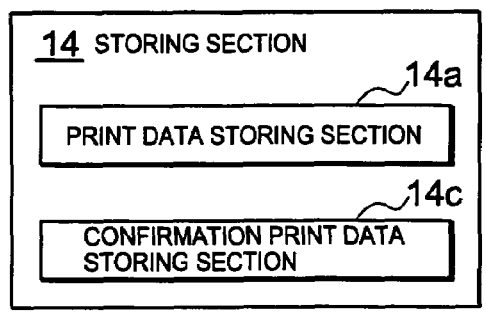
FIG. 16 is a block diagram showing structure of a storing section in embodiment 2.

FIG. 14 is a block diagram showing structure of a print driver in embodiment 2; FIG. 15 is a block diagram showing structure of a print data managing section in embodiment 2; and FIG. 16 is a block diagram showing structure of a storing section in embodiment 2.

In the embodiment, the print driver 12, as shown by FIG. 14, further has a confirmation print data generating section 12d. The confirmation print data generating section 12d, in the case that the print mode set by the print mode setting section 12a is confirmation print mode, generates print data (hereinafter: confirmation print data) of page to execute confirmation print set by the confirmation page setting section 12b.

Further, the print data managing section 13, as shown by FIG. 15, to replace the print data writing section 13a and the print page managing section 13c in the embodiment 1, has a print data writing section 33a and a print page managing section 33c. Furthermore, the storing section 14, as shown by FIG. 16, to replace the management list storing section 14b in the embodiment 1, has a confirmation print data storing section 14c.

Then, the print data writing section 33a to correspond to the print mode set by the print mode setting section 12a and according to an instruction of the print page managing section 33c, respectively writes the print data generated by the print data generating section 12c and the confirmation print data generated by the confirmation print data generating section 12d into the print data storing section 14a and the confirmation print data storing section 14c of the storing section 14. Further, the print page managing section 33c as a selecting and outputting section, to correspond to the print mode set by the print mode setting section 12a, performs an instruction regarding a storing place of the print data written by the print data writing section 33a, and to performs an instruction to instruct the print data reading section 13b to read which print data. Furthermore, in the case that the print mode set by the print mode setting section 12a is confirmation print mode, in the confirmation print data storing section 14c, the confirmation print data is written by the print data writing section 33a.

Next is to explain operations of the print system in the embodiment. Firstly, print data generation process executed by the print driver 12 of the host computer 10 will be explained.

Figure 17:
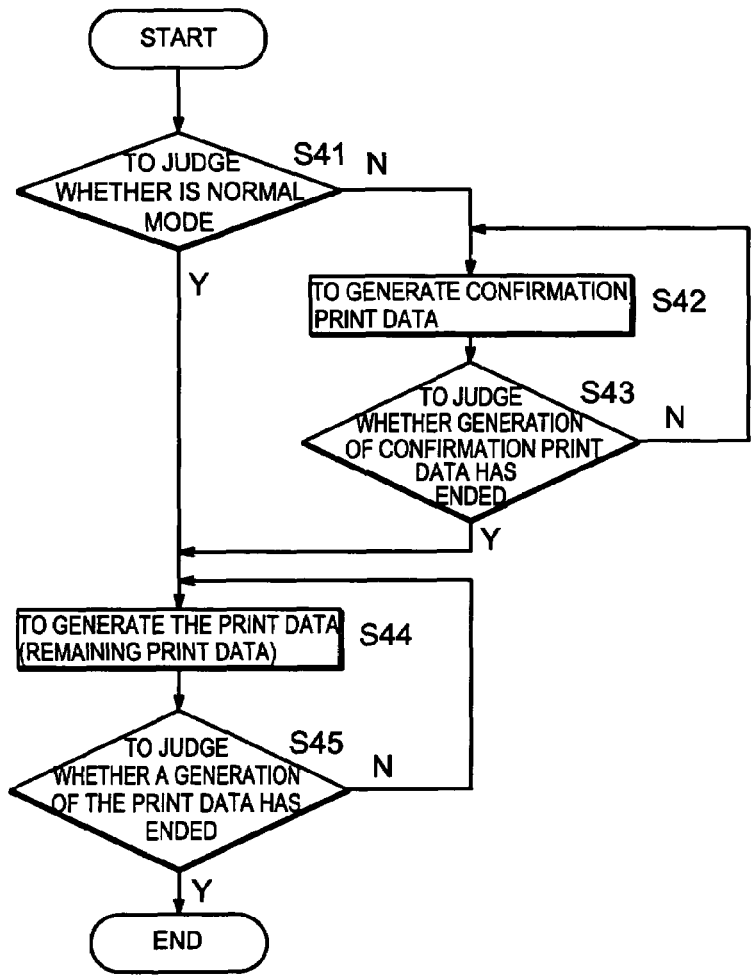
FIG. 17 is a flowchart showing operations of print data generation process in embodiment 2.

FIG. 17 is a flowchart showing operations of print data generation process in embodiment 2.

First, when an image is made in the application section 11 and a print request occurs, the print driver 12 judges the print mode set by the print mode setting section 12a and judges whether is normal mode. Then, in the case that the print mode is normal mode, the print data generating section 12c sequentially changes the image made by the application section 11 into data capable of being printed by the printer 20, and generates print data.

Then, the print driver 12, whenever the print data is generated, judges whether all of the image made by the application section 11 have been changed into the print data, that is, to judges whether the generation of the print data has ended. Here, in the case that the all of the image is not yet completely changed into the print data, the print data generating section 12c is to continuously generate print data; in the case that all of the print data has been changed, the print data generating section 12c ends the print data generation process.

Further, in the case that the print mode is not normal mode, but is confirmation print mode, the confirmation print data generating section 12d generates confirmation print data of the page to need to perform confirmation print set by the confirmation page setting section 12b.

Then, the print driver 12, whenever the confirmation print data is generated, judges whether all of the confirmation print data of the page set by the confirmation page setting section 12b has been generated, that is, to judges whether the generation of the confirmation print data has ended. Here, in the case that the confirmation print data of all pages set by the confirmation page setting section 12b has not yet been completely generated, the confirmation print data generating section 12d is to continuously generate confirmation print data; in the case that the confirmation print data of all pages set by the confirmation page setting section 12b has been completely generated, the print data generating section 12c executes a generation regarding print data (hereinafter: remaining print data) of the page except page set by the confirmation page setting section 12b.

Continuously, the print driver 12, whenever the remaining print data is generated, judges whether all remaining print data has been generated. Then, in the case that all remaining print data has not yet been generated, the print data generating section 12c is to continuously generate remaining print data; in the case that all remaining print data has been generated, the print data generating section 12c ends the print data generation process.

Moreover, in the embodiment, in the case that the print mode is confirmation print mode, the print data generating section 12c generates print data of the page except page set by the confirmation page setting section 12b. However, it is possible to generate all print data containing the page set by the confirmation page setting section 12b.

Next is to explain the flowchart.

Step S41: to judge whether is normal mode. If it is normal mode, to enter step S44; if it is not normal mode, to enter step S42.

Step S42: to generate confirmation print data.

Step S43: to judge whether a generation of the confirmation print data has ended. If the generation of the confirmation print data has ended, to enter step S44; if the generation of the confirmation print data has not yet ended, to return to the step S42.

Step S44: when the print mode is normal mode, to generate all print data; when the print mode is confirmation print mode, to generate the print data except the confirmation print data (remaining print data).

Step S45: to judge whether a generation of the print data has ended. If the generation of the print data has ended, to end the process; if the generation of the confirmation print data has not yet ended, to return to the step S44.

Next is to explain operations of print data output process. Moreover, the print data output process and the print data generation process are executed in parallel.

Figure 18:
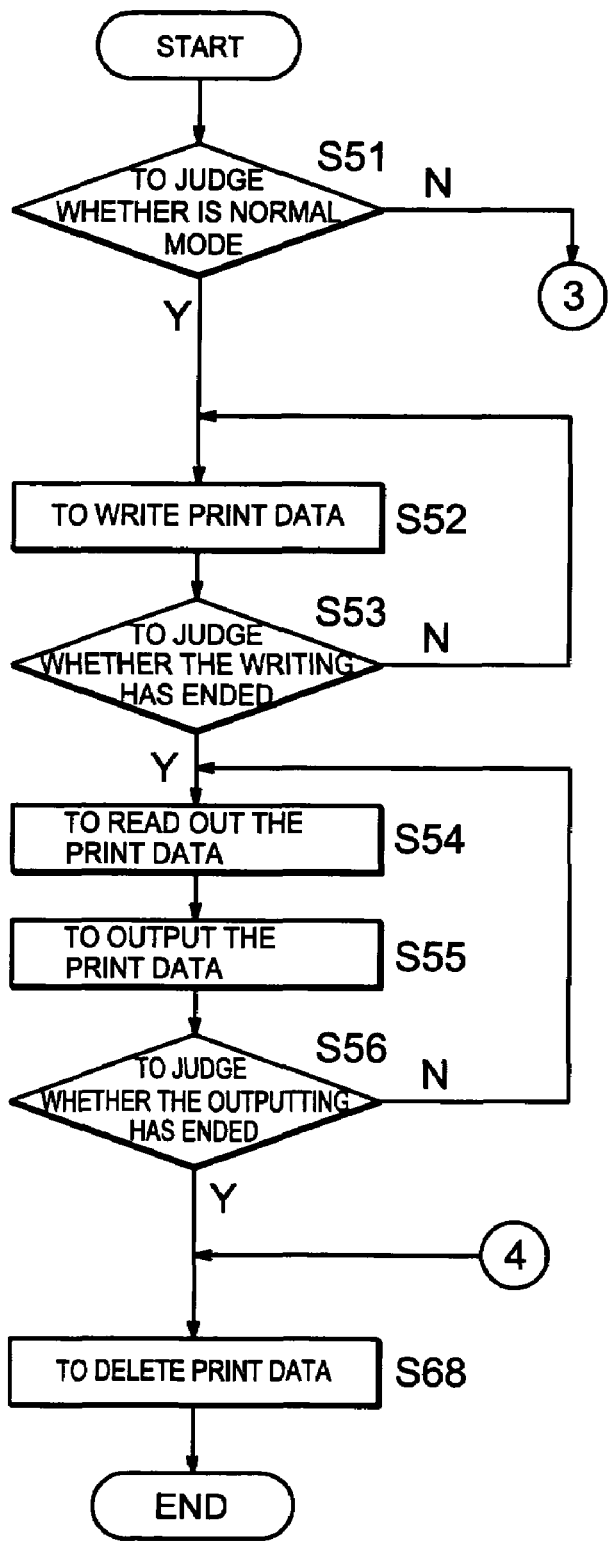
FIG. 18 is a first flowchart showing operations of print data output process in embodiment 2.
Figure 19:
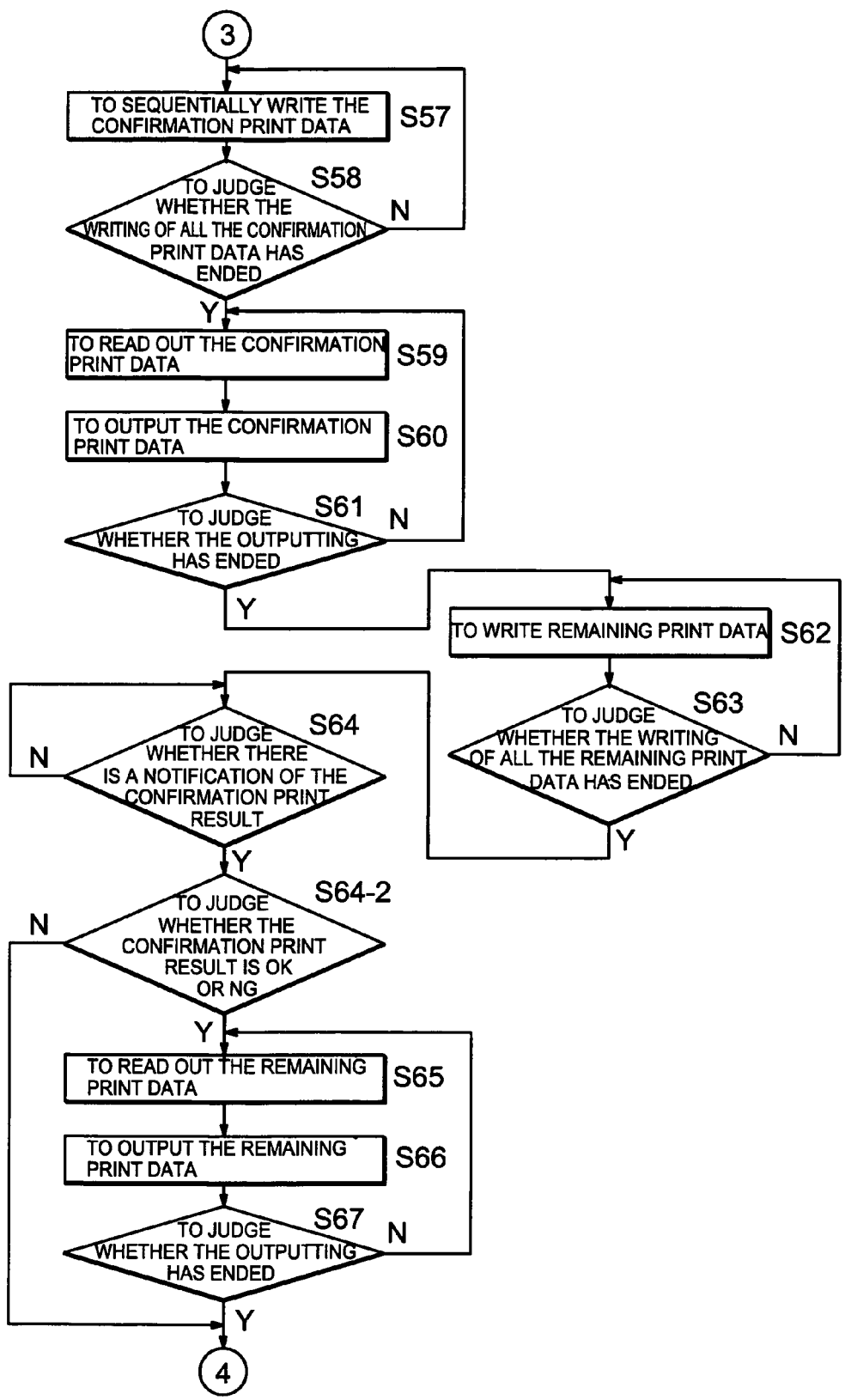
FIG. 19 is a second flowchart showing operations of print data output process in embodiment 2.

FIG. 18 is a first flowchart showing operations of print data output process in embodiment 2; and FIG. 19 is a second flowchart showing operations of print data output process in embodiment 2.

Firstly, the print page managing section 33c, when a request from the application section 11 occurs, judges the print mode set by the print mode setting section 12a and judges whether is normal mode. Then, in the case that the print mode is normal mode, print page managing section 33c instructs the print data writing section 33a to write the print data generated by the print data generating section 12c into the print data storing section 14a. Then, according to the instruction, the print data writing section 33a writes the print data into the print data storing section 14a.

Continuously, the print data managing section 13, whenever the print data writing section 33a writes the print data into the print data storing section 14a, judges whether all print data has been written into the print data storing section 14a, that is, judges whether the writing of the print data has ended. In the case that all print data has been written into the print data storing section 14a, the print page managing section 33c instructs the print data reading section 13b to sequentially read out the print data written into the print data storing section 14a and to output the print data to the printer 20. Then, according to the instruction, the print data reading section 13b reads out the print data written into the print data storing section 14a and outputs the print data to the printer 20.

Then, the print data managing section 13, whenever the print data is outputted into the printer 20, judges whether all of the print data has been outputted, that is, judges whether an output has ended. In the case that all of the print data has been outputted, the print data managing section 13 deletes the print data stored in the print data storing section 14a and ends the output of the print data.

Further, in the case that the print data managing section 13 judges the print mode and the print mode is not normal mode but is confirmation print mode, the print page managing section 33c instructs the print data writing section 33a to write the confirmation print data generated by the confirmation print data generating section 12d into the confirmation print data storing section 14c. Then, according to the instruction, the print data writing section 33a writes the confirmation print data into the confirmation print data storing section 14c.

Continuously, the print data managing section 13, whenever the print data writing section 33a writes the confirmation print data into the confirmation print data storing section 14c, judges whether all confirmation print data has been written into the confirmation print data storing section 14c, that is, judges whether the writing of the confirmation print data has ended. In the case that all confirmation print data has been written into the confirmation print data storing section 14c, the print page managing section 33c instructs the print data reading section 13b to sequentially read out the confirmation print data written into the confirmation print data storing section 14c and to output the confirmation print data to the printer 20. Then, according to the instruction, the print data reading section 13b reads out the confirmation print data written into the confirmation print data storing section 14c and outputs the confirmation print data to the printer 20.

Then, the print data managing section 13, whenever the confirmation print data is outputted into the printer 20, judges whether all of the confirmation print data has been outputted to the printer 20, that is, judges whether an output has ended. In the case that all of the confirmation print data has been outputted to the printer 20, the print data managing section 13 waits to be informed of a confirmation print result from the printer 20.

Further, in the case that all confirmation print data has been written into the confirmation print data storing section 14c, the print page managing section 33c instructs the print data writing section 33a to write the remaining print data generated by the print data generating section 12c into the print data storing section 14a. Then, according to such instruction, the print data writing section 33a writes the remaining print data into the print data storing section 14a.

Continuously, the print data managing section 13, whenever the print data writing section 33a writes the remaining print data into the print data storing section 14a, judges whether all remaining print data has been written into the print data storing section 14a, that is, judges whether the writing of the remaining print data has ended. In the case that all remaining print data has been written into the print data storing section 14a, the print data managing section 13 waits to be informed of a confirmation print result from the printer 20.

Then, when a confirmation print result is informed from the printer 20 and the confirmation print result is OK, the print page managing section 33c instructs the print data reading section 13b to sequentially read out the remaining print data written into the print data storing section 14a and to output the remaining print data to the printer 20. Then, according to the instruction, the print data reading section 13b reads out the remaining print data written into the print data storing section 14a and outputs the confirmation print data to the printer 20.

Continuously, the print data managing section 13, whenever the remaining print data is outputted into the printer 20, judges whether all the remaining print data has been outputted to the printer 20, that is, judges whether an output has ended. In the case that all the remaining print data has been outputted to the printer 20, the print data managing section 13 deletes the print data of the print data storing section 14a and the confirmation print data storing section 14c, and ends the output process of print data.

Moreover, in the embodiment, when there is a notification of confirmation print result from the printer 20, only the remaining print data is outputted to the printer 20. However, it is possible to output the both of the remaining print data and the confirmation print data, in the case, pages can be arranged once more.

Next is to explain the flowchart.

Step S51: to judge whether is normal mode. If it is normal mode, to enter step S52; if it is not normal mode, to enter step S57.

Step S52: to write print data.

Step S53: to judge whether the writing has ended. If it has ended, to enter step S54; if it has not yet ended, to return to the step S52.

Step S54: to read out the print data.

Step S55: to output the print data.

Step S56: to judge whether the outputting has ended. If it has ended, to enter step S68; if it has not yet ended, to return to the step S54.

Step S57: when the print mode is confirmation print mode, to sequentially write the confirmation print data make by the confirmation print data generating section 12d into the confirmation print data storing section 14c.

Step S58: to judge whether the writing of all the confirmation print data has ended. If it has ended, to enter step S59; if it has not yet ended, to return to the step S57.

Step S59: to read out the confirmation print data.

Step S60: to output the confirmation print data.

Step S61: to judge whether the outputting has ended. If it has ended, to enter step S64; if it has not yet ended, to return to the step S59.

Step S62: to write remaining print data into the print data storing section 14a.

Step S63: to judge whether the writing of all the remaining print data has ended. If it has ended, to enter step S64; if it has not yet ended, to return to the step S62.

Step S64: to judge whether there is a notification of the confirmation print result. If there is the notification of the confirmation print result, to enter step S65; if there is not the notification of the confirmation print result, to stand by. Further, in the case that there is not yet a notification of the confirmation print result even if a predetermined time is over, to enter step S68 together with informing user of the thing having no notification.

Step S64-2: in the case that the notification content of the confirmation print result is OK, to enter step S65; if the notification content of the confirmation print result is NG, to enter step S68.

Step S65: to read out the remaining print data.

Step S66: to output the remaining print data.

Step S67: to judge whether the outputting has ended. If it has ended, to enter step S68; if it has not yet ended, to return to the step S65.

Step S68: to delete print data, and to end the process.

As stated above, in the embodiment, because the confirmation print data generating section 12d is provided, before to generate the print data of predetermined unit, the print data of the page needing confirmation print can be generated and can be outputted. Therefore, it is possible to short the time till the page needing confirmation print is printed.

Further, in the embodiment, because a storing area used for the page needing the confirmation print is provided, and with the storing area is used to store, the remaining print data is stored into another storing area, so the management list of the print data is not needed. Therefore, it is unnecessary to judge the content of the management list while printing and outputting, and it is possible to easily perform a control of printing and outputting.

Next, an embodiment 3 of the present invention will be explained. Moreover, in the embodiment 2, regarding the same compositions, they will be granted the same symbols, and the same explanations will be omitted. Further, regarding the same operations and the same effects as that in the embodiment 1 and in the embodiment 2, they will also be omitted.

Figure 20:
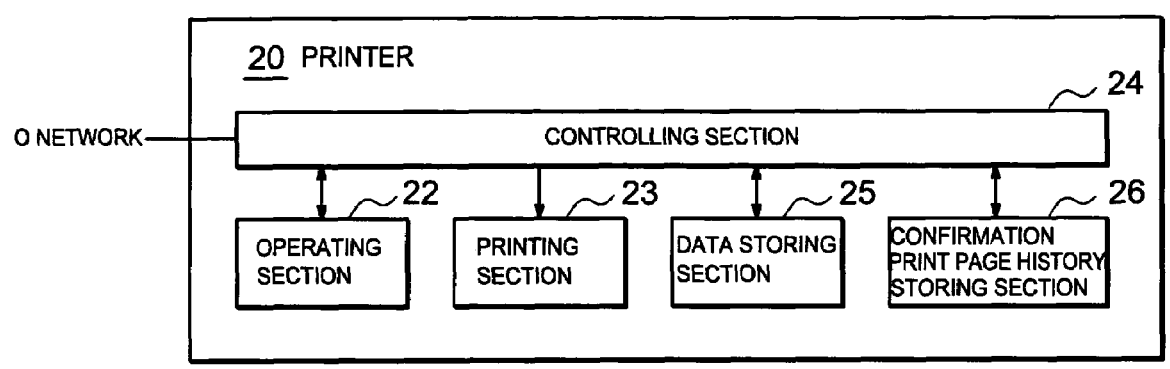
FIG. 20 is a block diagram showing structure of a printer in embodiment 3.
Figure 21:
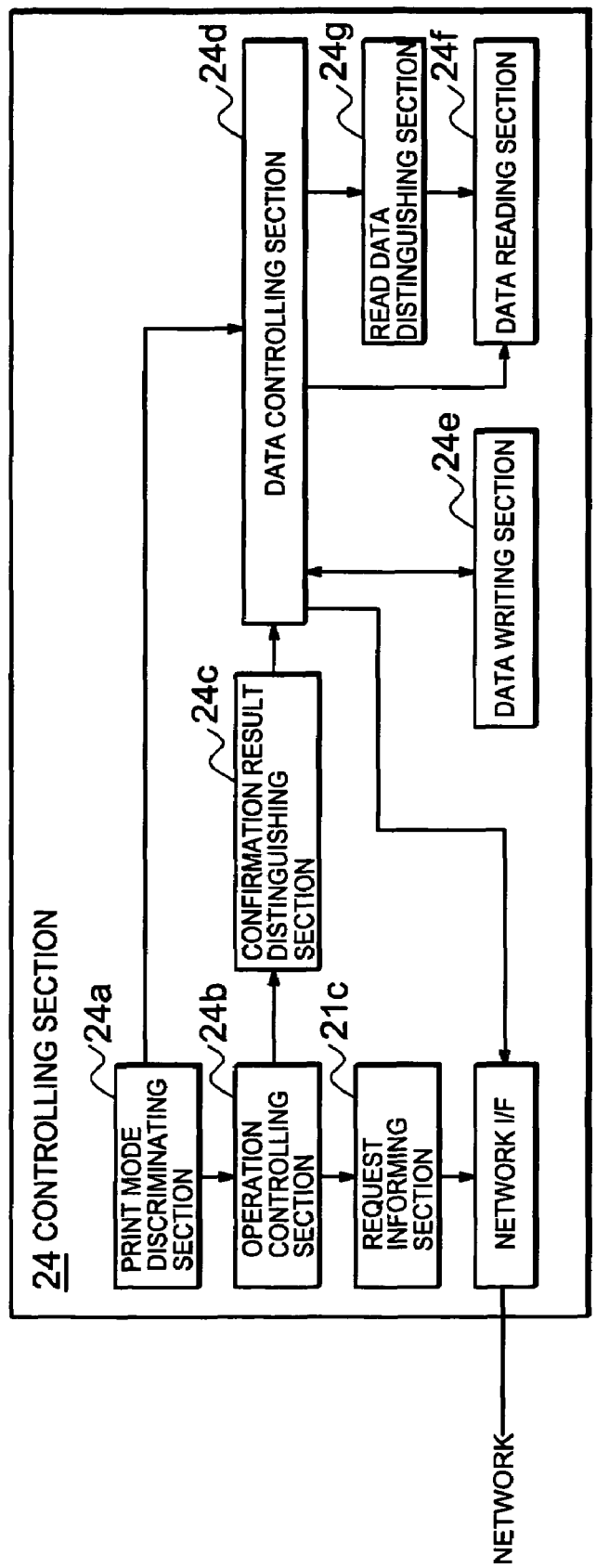
FIG. 21 is a block diagram showing structure of a controlling section in embodiment 3.

FIG. 20 is a block diagram showing structure of a printer in embodiment 3; and FIG. 21 is a block diagram showing structure of a controlling section in embodiment 3.

In the embodiment, the printer 20, as shown by FIG. 20, the printer 20 has a operating section 22 being as an interface with user; a printing section 23 to receive print data outputted from the host computer 10 and to print the print data; a controlling section 24 to control the printer 20; a data storing section 25 to store confirmation print data when the print mode is confirmation print mode; and a confirmation print page history storing section 26 to store a page number of the confirmation print data stored in the data storing section 25 and to store a store place of the confirmation print data.

The controlling section 24, as shown by FIG. 21, has a print mode discriminating section 24a; a operation controlling section 24b; a confirmation result distinguishing section 24c; data controlling section 24d; a data writing section 24e; a data reading section 24f; read data distinguishing section 24g; and a request informing section 21c.

Here, the print mode discriminating section 24a discriminates print mode of the received print data and informs the data controlling section 24d of the discriminated information;

The operation controlling section 24b executes a control of the operating section 22, and when the discriminated result in the print mode discriminating section 24a is confirmation print mode, informs the request informing section 21c and the confirmation result distinguishing section 24c of a confirmation print result inputted into the confirmation result inputting section 22b;

The confirmation result distinguishing section 24c, when the discriminated result in the print mode discriminating section 24a is confirmation print mode, receives a notification of the confirmation print result from the confirmation result inputting section 22b, and distinguishes the confirmation print result.

The data controlling section 24d, in the case that the discriminated result in the print mode discriminating section 24a is confirmation print mode, in order to store confirmation print data into the data storing section 25, instructs the data writing section 24e to write the confirmation print data; in the case that the distinguished result in the confirmation result distinguishing section 24c has no problem, when received remaining print data from the host computer 10, informs the read data distinguishing section 24g of the thing having received the remaining print data;

The data writing section 24e, according to an instruction of the data controlling section 24d, stores the received confirmation print data into the data storing section 25, and writes the page number and the store place of the stored confirmation print data into the confirmation print page history storing section 26;

The data reading section 24f, according to an instruction of the read data distinguishing section 24g, reads out the confirmation print data stored in the data storing section 25; and The read data distinguishing section 24g, when the informed of the thing having received the remaining print data from the data controlling section 24d, compares the page number of the confirmation print data stored in the confirmation print page history storing section 26 with the page number of the received remaining print data, and instructs the printing section 23 to sequentially execute print and instructs the data reading section 24f to read out the confirmation print data of the page in which the remaining print data is inexistent.

Next is to explain operations of the printing system in the embodiment. Firstly, operations of the printer 20 will be explained.

Figure 22:
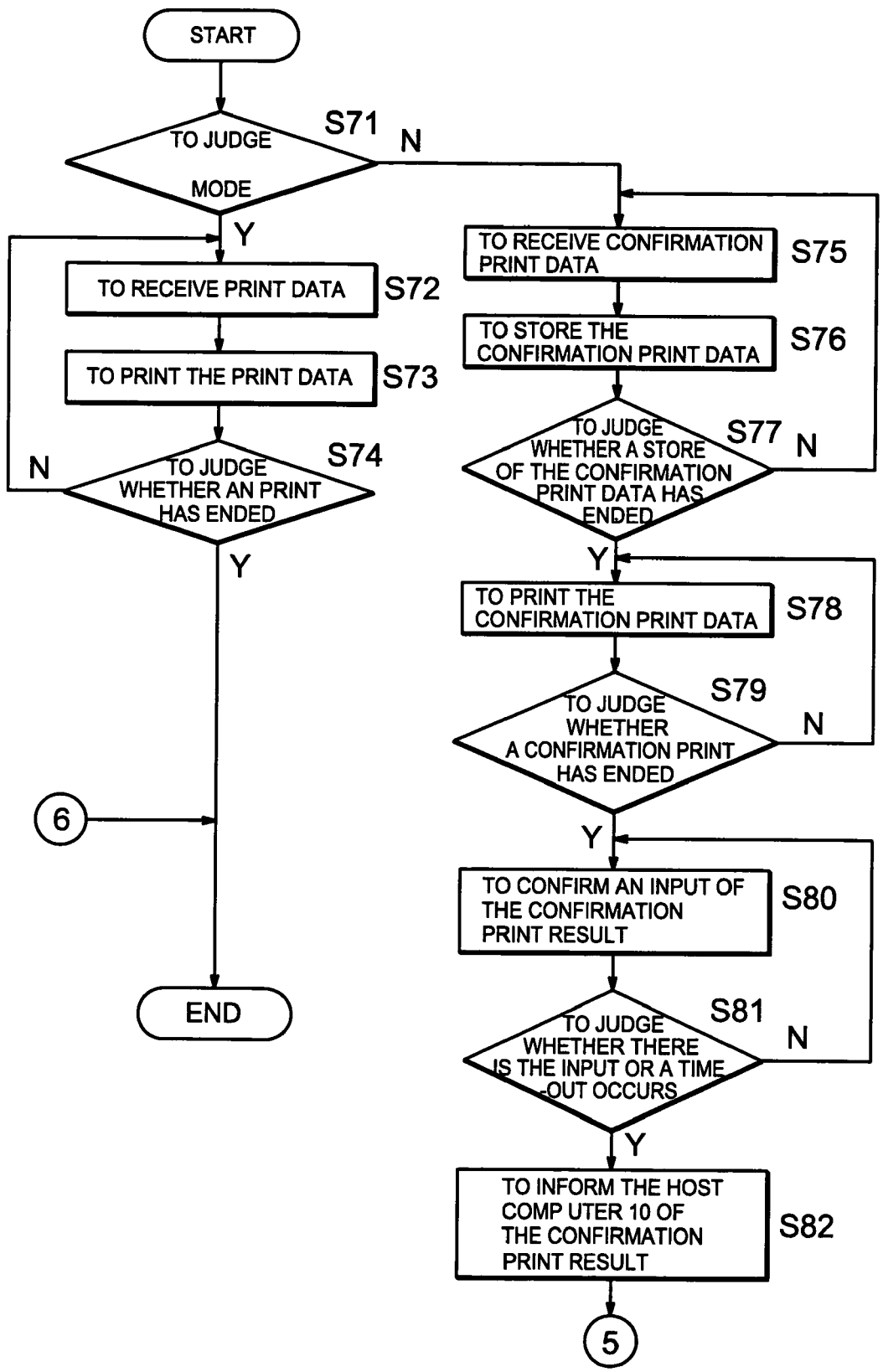
FIG. 22 is a first flowchart showing operations of a printer in embodiment 3.
Figure 23:
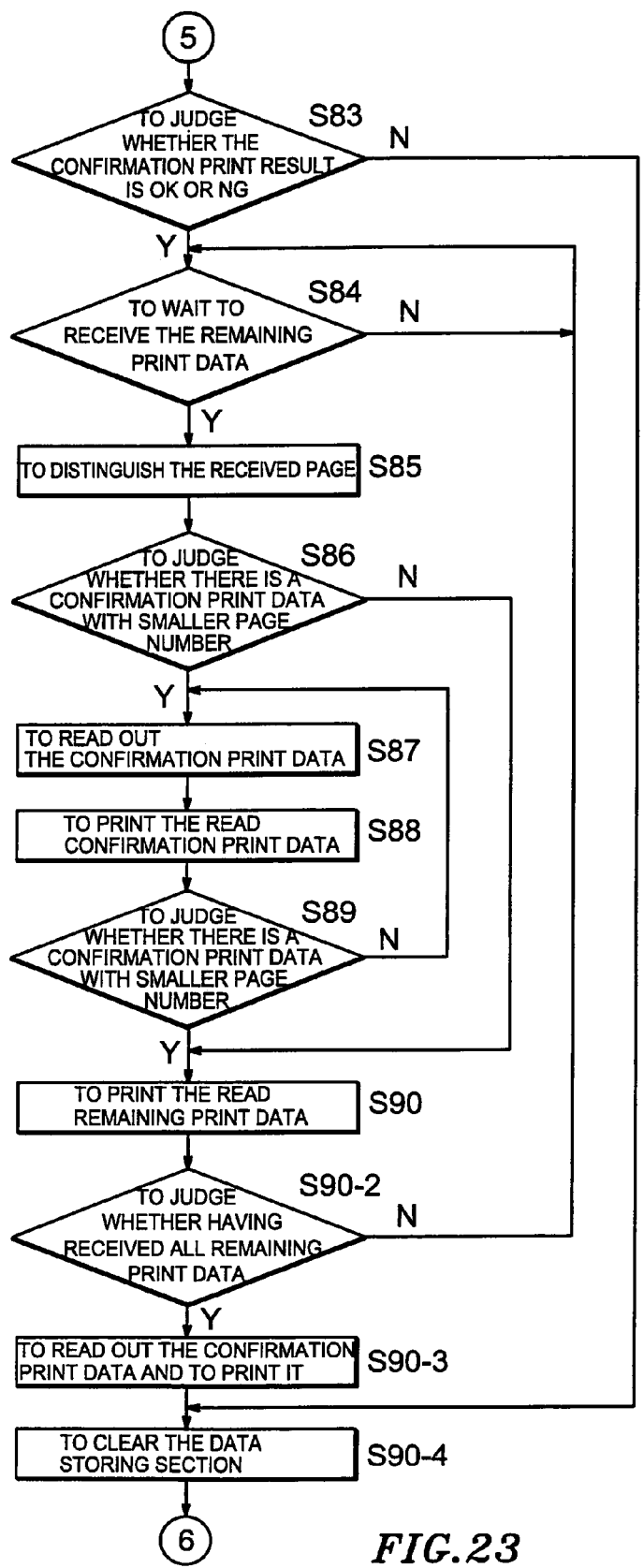
FIG. 23 is a second flowchart showing operations of a printer in embodiment 3.

FIG. 22 is a first flowchart showing operations of a printer in embodiment 3; and FIG. 23 is a second flowchart showing operations of a printer in embodiment 3.

First, when the printer 20 received the print data from the host computer 10, the print mode discriminating section 24a judges whether the received print data is normal mode. When it is the normal mode, the printer 20 continuously receives the print data and continuously executes the print of the received print data. Then, the controlling section 24, whenever the print of one page part of the received print data ended, judges whether the print of all pages of the received print data has ended, when the print of all pages of the received print data has ended, ends the process.

Further, to judge whether is normal mode. In the case that the print mode is not normal mode, but is confirmation print mode, to receive the confirmation print data of the one page part. Then, the data controlling section 24d instructs the data writing section 24e to store the received confirmation print data of the one page part into the data storing section 25. Then, according to such instruction, the data writing section 24e writes the received confirmation print data of the one page part into the data storing section 25, and writes the page number and the store place information of the confirmation print data stored in the data storing section 25 into the confirmation print page history storing section 26.

Next, the controlling section 24, whenever the confirmation print data is stored into the data storing section 25, judges whether all pages of the confirmation print have been stored into the data storing section 25, that is, to judges whether the store has ended. Then, if all pages of the confirmation print have not yet been stored into the data storing section 25, the controlling section 24 repeats the above operation till all pages of the confirmation print are stored.

Further, if all pages of the confirmation print have been stored into the data storing section 25, the data controlling section 24d instructs the data reading section 24f to read out the confirmation print data stored in the data storing section 25. Then, according to such instruction, the data reading section 24f reads out the confirmation print data. Then, the data controlling section 24d forwards the read confirmation print data to the printing section 23. Then, the printing section 23 performs a print.

Continuously, the controlling section 24, whenever the print of the one page part of the confirmation print data ended, judges whether the print of all pages of the confirmation print data has ended. If the print of all pages of the confirmation print data has not yet ended, the controlling section 24 repeats the above operation till the print of all pages of the confirmation print ends.

Further, if the print of all pages of the confirmation print data has ended, the operation controlling section 24b instructs the message displaying section 22a to display a message to request an input of a confirmation print result with respect to the user. Then, according to such instruction, the message displaying section 22a displays the message, and the printer 20 waits the user to input the confirmation print result to the confirmation result inputting section 22*b*.

Then, the operation controlling section 24*b* monitors a input state of the confirmation result inputting section 22*b*. Here, when there is the input of the confirmation print result, the request informing section 21*c* informs the host computer 10 of the content inputted into the confirmation result inputting section 22*b*. Further, the confirmation result distinguishing section 24*c* judges whether the confirmation print result is OK. If there is trouble, the contents of the data storing section 25 and the confirmation print page history storing section 26 is cleared, and the process is ended. If the confirmation print result is OK, the printer 20 waits to receive the remaining print data from the host computer 10.

Then, when the remaining print data outputted from the host computer 10 is received, the data controlling section 24*d* distinguishes the page number of the received remaining print data, and informs the read data distinguishing section 24*g* of the distinguished page number. Then, the read data distinguishing section 24*g* compares the informed page number with the content of the confirmation print page history storing section 26, on the basis of the front and the rear relations between the received remaining print data and the confirmation print data, judges whether to read out the confirmation print data and to print it.

In the concrete, the read data distinguishing section 24*g*, in the case that there is a confirmation print data which has a page number smaller than that of the received remaining print data and is not again processed after confirmation print, instructs the data reading section 24*f* to read out the confirmation print data according to the small order (i.e. decreasing order) of pages.

The data reading section 24*f*, according to the instruction, reads out the confirmation print data from the data storing section 25. Then, the data controlling section 24*d* forwards the data of the read confirmation print data to the printing section 23. Then, the printing section 23 prints the confirmation print data according to a page order.

Then, when the confirmation print data which is unprinted and has a page number smaller than that of the received remaining print data becomes inexistence, the controlling section 24 instructs the printing section 23 to print the received remaining print data. Thus, a print is performed.

Then, the controlling section 24, whenever receiving one page part of the remaining print data, executes the prints of the confirmation print data mentioned above and the received remaining print data. When the receiving of all remaining print data ends, the controlling section 24 judges whether the page of the unprinted confirmation print data remains. If the page of the unprinted confirmation print data remains, the controlling section 24 instructs the data reading section 24*f* to read out the confirmation print data according to the small order of pages, and print the read confirmation print data. In the case that the print of all pages ended, the controlling section 24 clears the content of the data storing section 25 and the confirmation print page history storing section 26, and ends the process.

Moreover, in the embodiment, in the print process after user has confirmed the confirmation print result, while receiving the remaining print data, the data of the page to be printed is judged whether is the remaining print data or the confirmation print data. However, it is possible to also store the remaining print data into the data storing section 25 and after all print data are collected, to arrange once more the pages and to print them.

Further, in the print of the confirmation print data, after storing the confirmation print data into the data storing section 25, the confirmation print data is read out of the data storing section 25 and is printed. However, it is possible to perform the print after the confirmation print data of one page part is stored into the data storing section 25, to execute the print and the receiving in parallel.

Next is to explain the flowcharts.

Step S71: to judge whether is normal mode. If it is normal mode, to enter step S72; if it is not normal mode, to enter step S75.

Step S72: to receive print data.

Step S73: to print the print data.

Step S74: to judge whether a print has ended. If the print has ended, to end the process; if the print has not yet ended, to return to the step S72.

Step S75: to receive confirmation print data.

Step S76: to store the confirmation print data.

Step S77: to judge whether a store of the confirmation print data has ended. If the store of the confirmation print data has ended, to enter step S78; if the store of the confirmation print data has not yet ended, to return to the step S75.

Step S78: to print the confirmation print data.

Step S79: to judge whether confirmation print of the confirmation print data has ended. If the confirmation print of the confirmation print data has ended, to enter step S80; if the confirmation print of the confirmation print data has not yet ended, to return to the step S78.

Step S80: to confirm an input of the confirmation print result.

Step S81: to judge whether there is the input. If there is the input, to enter step S82; if there is not the input, to return to the step S80. Further, when a predetermined time is over, the confirmation print result becomes NG, to enter the step S82.

Step S82: to inform the host computer 10 of the confirmation print result.

Step S83: to judge whether the confirmation print result is OK or NG, if it is OK, to enter step S84; if it is NG, to enter step S90-4.

Step S84: to wait to receive the remaining print data, if received, to enter step S85.

Step S85: with receiving the one page part of the remaining print data, to distinguish the received page.

Step S86: to judge whether there is a confirmation print data which is unprinted yet and has a small page number smaller than the received page number. If there is, to enter step S87; if there is not, to enter step S90.

Step S87: according to the small order, to read out the confirmation print data judged in step S86.

Step S88: to print the read confirmation print data.

Step S89: to judge whether there is a confirmation print data which is unprinted yet and has a small page number smaller than the received page number. If there is, to enter step S87; if there is not, to enter step S90.

Step S90: to print the read remaining print data.

Step S90-2: to judge whether having received all remaining print data. If there is the remaining page, to enter step S84; if received the all remaining print data, to enter step S90-3.

Step S90-3: to judge whether there is the confirmation print data which is unprinted and has a small page number smaller than the received page number. If there is, to read out the confirmation print data and to print it according to the page order, and to enter step S90-4.

Step S90-4: to clear the data storing section 25, and to end the process.

As stated above, in the embodiment, to store the confirmation print data, to compare the page number of the stored confirmation print data with the page number of the remaining print data received from the host computer 10, an to select the data to be printed from the confirmation print data and the remaining print data. Therefore, in the print after user performed a confirmation print, it is possible to obtain the confirmation print result from first page according to the page order. Further, after user obtained the confirmation print result of the remaining print data, it is possible to remove the time produced due to a hand operation to arrange again the page number of print sheets.

Next, an embodiment 4 of the present invention will be explained. Moreover, in the embodiment 2, regarding the same compositions, they will be granted the same symbols, and the same explanations will be omitted. Further, regarding the same operations and the same effects as that in the embodiments 1, 2 and 3, they will also be omitted.

Figure 24:
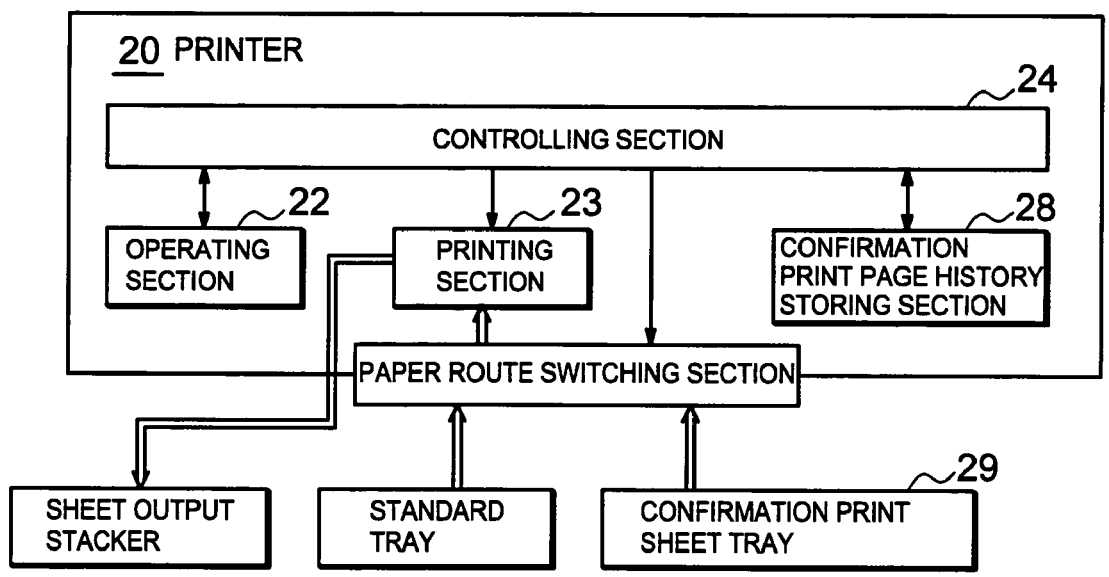
FIG. 24 is a block diagram showing structure of a printer in embodiment 4.
Figure 25:
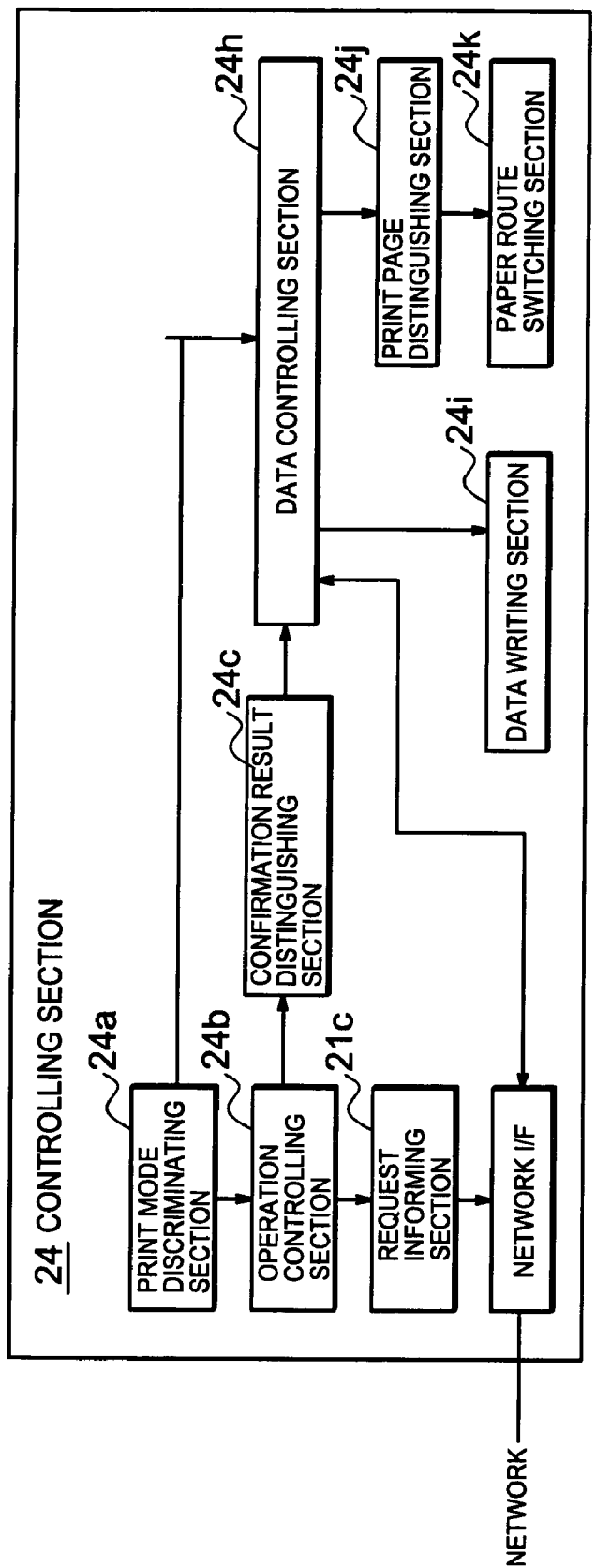
FIG. 25 is a block diagram showing structure of a controlling section in embodiment 4.

FIG. 24 is a block diagram showing structure of a printer in embodiment 4; and FIG. 25 is a block diagram showing structure of a controlling section in embodiment 4.

In the embodiment, the printer 20, as shown by FIG. 24, the printer 20 has a operating section 22; a printing section 23; a controlling section 24; a confirmation print page history storing section 28 and a confirmation print sheet tray 29. Here, the confirmation print page history storing section 28 stores the confirmation print data printed and outputted. The confirmation print sheet tray 29, after user confirmed the confirmation print result in which the confirmation print data is printed and if the confirmed result has no trouble, is used to insert the sheet for confirmation print (hereinafter: confirmation print sheet).

The controlling section 24, as shown by FIG. 25, has a print mode discriminating section 24a; a operation controlling section 24b; a confirmation result distinguishing section 24c; a data controlling section 24h; a data writing section 24i; a print page distinguishing section 24j serving as a tray selecting means; a paper route switching section 24k and a request informing section 21c.

Here, the data controlling section 24h, in the case that the discriminated result in the print mode discriminating section 24a is confirmation print mode, instructs the data writing section 24i to write the page number of the printed confirmation print data into the confirmation print page history storing section 28; in the case that the distinguished result in the confirmation result distinguishing section 24c has no problem, next when received remaining print data from the host computer 10, informs the print page distinguishing section 24j of the thing having received the remaining print data;

The data writing section 24i, according to an instruction of the data controlling section 24h as an image data selecting means, writes the page number of the printed confirmation print data into the confirmation print page history storing section 28;

The print page distinguishing section 24j, when being informed that the remaining print data is received from the data controlling section 24h, compares the page number of the confirmation print data, which is stored in the confirmation print page history storing section 28 with the page number of the received remaining print data, distinguishes whether to output the confirmation print sheet or to output print sheet for the received remaining print data so as to make the print result be arranged according to an order, if the confirmation print sheet is outputted, instructs the paper route switching section 24k to output the confirmation print sheet; and The paper route switching section 24k, when the print page distinguishing section 24j distinguishes to output the confirmation print sheet, according to an instruction of the print page distinguishing section 24j, outputs the print-finished confirmation print sheet from the confirmation print sheet tray 29.

Next is to explain operations of a print system in the embodiment. Firstly, operations of the printer 20 will be explained.

Figure 26:
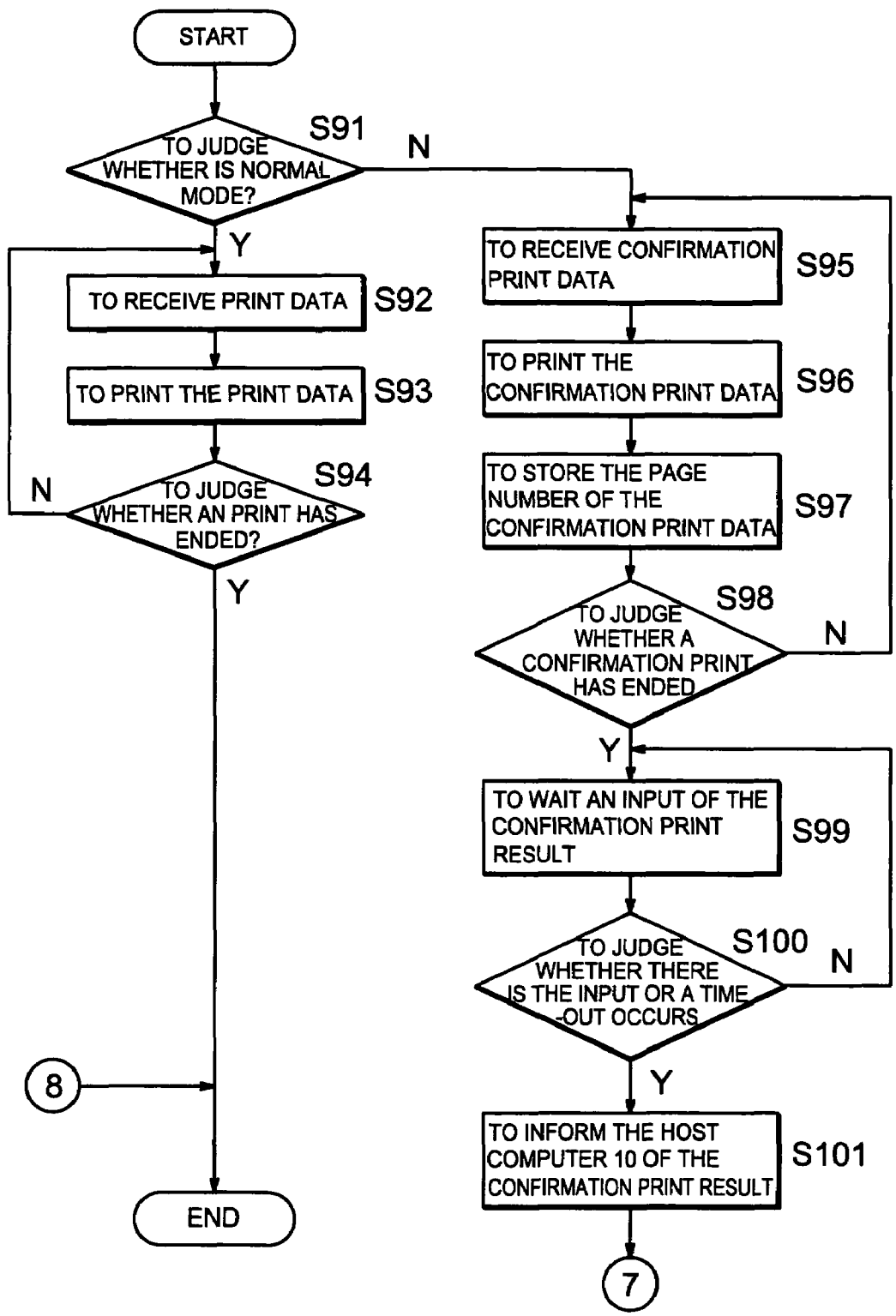
FIG. 26 is a first flowchart showing operations of a printer in embodiment 4.
Figure 27:
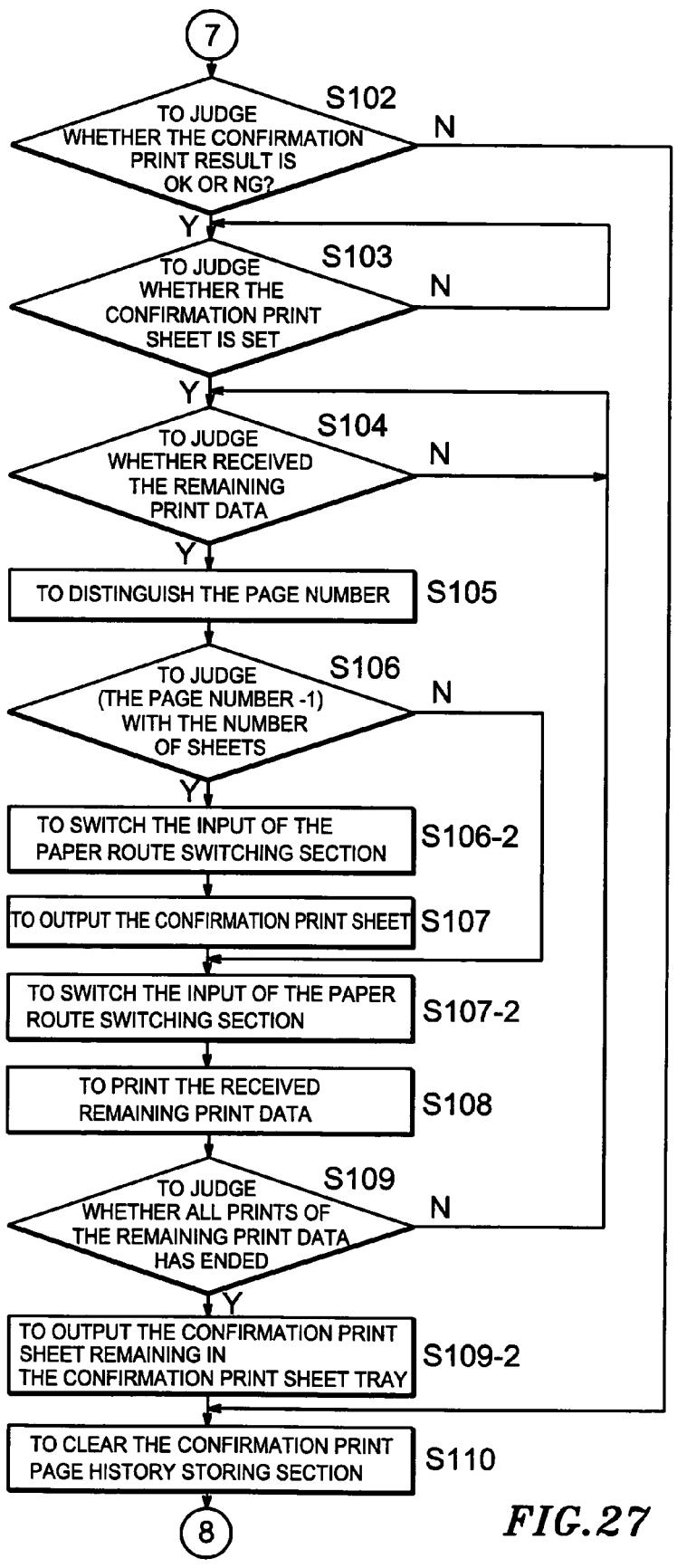
FIG. 27 is a second flowchart showing operations of a printer in embodiment 4.

FIG. 26 is a first flowchart showing operations of a printer in embodiment 4; and FIG. 27 is a second flowchart showing operations of a printer in embodiment 4.

First, when the printer 20 received the print data from the host computer 10, the print mode discriminating section 24a judges whether the received print data is normal mode. When it is the normal mode, the printer 20 continuously receives the print data and continuously executes the print of the received print data. Then, the controlling section 24, whenever the print of one page part of the received print data ended, judges whether the print of all pages of the received print data has ended, when the print of all pages of the received print data has ended, ends the process.

Further, the controlling section 24 judges whether is normal mode. In the case that the print mode is not normal mode, but is confirmation print mode, the controlling section 24 receives the confirmation print data of the one page part and prints the confirmation print data. Then, the data controlling section 24h, whenever the confirmation print data is printed, instructs the data writing section 24i to write the page number of the printed confirmation print data into the confirmation print page history storing section 28. Then, according to such instruction, the data writing section 24i writes the page number of the printed confirmation print data into the confirmation print page history storing section 28. Then, the data controlling section judges whether the print of all pages of the confirmation print has ended. If the print of all pages of the confirmation print has not yet ended, repeats the above operation till all pages of the confirmation print are printed.

Further, if all pages of the confirmation print have been printed, the operation controlling section 24b instructs the message displaying section 22a to display a message to request an input of a confirmation print result with respect to the user. Then, according to such instruction, the message displaying section 22a displays the message, and the printer 20 waits the user to input the confirmation print result to the confirmation result inputting section 22b.

Then, the operation controlling section 24b monitors a input state of the confirmation result inputting section 22b. Here, when there is the input of the confirmation print result, the request informing section 21c informs the host computer 10 of the content inputted into the confirmation result inputting section 22b. Further, the confirmation result distinguishing section 24c judges whether the confirmation print result is OK. If there is trouble, the contents of the confirmation print page history storing section 28 is cleared, and the process is ended. If the confirmation print result is OK, the printer 20 waits till user set the confirmed confirmation print sheet to the confirmation print sheet tray 29. In the case that the confirmation print sheet is set to the confirmation print sheet tray 29, the printer 20 waits to receive the remaining print data from the host computer 10.

Then, when the remaining print data outputted from the host computer 10 is received, the data controlling section 24h distinguishes the page number of the received remaining print data, and informs the print page distinguishing section 24j of the distinguished page number. Then, the print page distinguishing section 24j compares the informed page number with the content of the confirmation print page history storing section 28, on the basis of the front and the rear relations between the received remaining print data and the confirmation print data, judges whether to output the confirmation print sheet or to output the sheet of the remaining print data.

That is, the controlling section 24 compares the page number of the received remaining print data with the number of sheets outputted by the printing section 23 in the print of the remaining print data after confirmation print result.

If the expression (the number of sheets=the page number of the received remaining print data−1) holds, an input of the paper route switching section 24k serves as a standard tray, the sheet is provided from the standard tray to the printing section 23. After the received remaining print data is printed, the sheet is outputted to a sheet output stacker.

If the above expression does not hold, the input of the paper route switching section 24k is switched to the confirmation print sheet tray 29.

Then, to provide the confirmation print sheet on the confirmation print sheet tray to the printing section 23, till the expression (the number of sheets=the page number of the received remaining print data−1) becomes to hold, the confirmation print sheet is outputted to the sheet output stacker.

After that, the input of the paper route switching section 24k serves as a standard tray, the sheet is provided from the standard tray to the printing section 23. after the received remaining print data is printed, the sheet is outputted to a sheet output stacker.

Then, the controlling section 24, whenever the sheet is outputted, judges whether the print of all pages has ended. If it has not yet ended, the controlling section 24 repeats the above operation; and if it has ended, the controlling section 24 clears the content of the confirmation print page history storing section 28, and ends the process.

Moreover, in the embodiment, after user sets the confirmation print sheet to the confirmation print sheet tray 29, while printing the remaining print data, the confirmation print sheet is inserted. However, it is possible to sequentially execute the print of the remaining print data and the output of the confirmation print sheet after all remaining print data is received.

Next is to explain the flowcharts.

Step S91: to judge whether is normal mode. If it is normal mode, to enter step S92; if it is confirmation print mode, to enter step S95.

Step S92: to receive print data.

Step S93: to print the print data.

Step S94: to judge whether a print has ended. If the print has ended, to end the process; if the print has not yet ended, to return to the step S92.

Step S95: to receive confirmation print data.

Step S96: to print the confirmation print data.

Step S97: to store the page number of the confirmation print data into the confirmation print page history storing section 28.

Step S98: to judge whether a confirmation print has ended. If it has ended, to enter step S99; if it has not yet ended, to return to the step S95.

Step S99: to wait an input of the confirmation print result.

Step S100: to judge whether there is the input. If there is the input, to enter step S101; if there is not the input, to return to the step S99. If a time-out occurs, the input is set to NG, and to enter step S101.

Step S101: to inform the host computer 10 of the confirmation print result.

Step S102: to judge whether the confirmation print result is OK or NG, if it is OK, to enter step S103; if it is NG, to enter step S110.

Step S103: to judge whether the confirmation print sheet is set. If it is set, to enter step S104; if it is not set, to stand by. When it is not set after a predetermined time, to make the displaying section to display the content, and to enter step S110.

Step S104: to judge whether received the remaining print data. If received, to enter step S105; if does not received, to stand by.

Step S105: to receive the one page part of the remaining print data, to distinguish the page number.

Step S106: to compare the (the page number of the received remaining print data−1) with the number of sheets outputted by the printing section 23 while the remaining print data after the confirmation print result is printed. If they are agreement, to enter step S107-2.

Step S106-2: to switch the input of the paper route switching section 24k to the confirmation print sheet tray 29.

Step S107: to output the confirmation print sheet set in the confirmation print sheet tray 29 to the sheet output stacker via the printing section 23 till the expression (the number of sheets=the page number of the received remaining print data−1) becomes to hold.

Step S107-2: to switch the input of the paper route switching section 24k to the standard tray.

Step S108: to print the received remaining print data.

Step S109: to judge whether all prints of the remaining print data has ended. If it has ended, to enter step S110; if it has not yet ended, to return to the step S104.

Step S109-2: in the case that page exists whose page number is smaller than the page printed with the remaining print data and confirmation print sheet still remains in the confirmation print sheet tray 29, after switched the input of the paper route switching section 24k to the confirmation print sheet tray 29, to output the confirmation print sheet.

Step S110: to clear the confirmation print page history storing section 28, and to end the process.

As stated above, in the embodiment, after the user sets the confirmation print sheet to the confirmation print sheet tray 29, while to select the confirmation print sheet or to select the print sheet of the remaining print data, the sheet can be sequentially outputted from first page. Therefore, it is possible to sequentially obtain the print result from first page for user. Further, because the sheet having been outputted in confirmation print can be used intactly, it is unnecessary to use the disused sheet.

Moreover, in the embodiments 1-4, only the example applied to the host computer is explained, but it is possible to apply the present invention to personal computer, work station, portable terminal, or apparatus capable making print document or image.

Moreover, in the embodiments 1-4, only the example applied to the printer is explained, but it is possible to apply the present invention to facsimile apparatus, copy apparatus, and multifunction apparatus.

Furthermore, in the embodiments 1-4, as a part to generate the print data, the print driver is explained, but it is possible to use application.

The present invention is not limited to the foregoing embodiments but many modifications and variations are possible within the spirit and scope of the appended claims of the invention.

What is claimed is:

1. A printing system which is formed by a image processing apparatus to generate print data and a image forming apparatus to be connected with the image processing apparatus, to receive the print data and to execute a print, and prints a part of the print data before printing the print data of predetermined unit, comprising:

wherein the image forming apparatus includes
an image forming section which form an image on the basis of the print data received from the image processing apparatus;
a print mode discriminating section which discriminates whether the received print data is image confirmation use data;
a confirmation result inputting section which inputs a confirmation result of the image when the discriminated result of the print mode discriminating section is the image confirmation use data; and
a request informing section which requests the image process to output the print data to correspond to the inputted confirmation result in the confirmation result inputting section;
wherein the image processing apparatus includes
a print data generating section to generate print data of predetermined unit;
a print data storing section in which the generated print data is stored; and
a selecting and outputting section to select a data range for the image confirmation and output the data of the data range;
wherein after the image confirmation use data is outputted to the image forming apparatus, when an output of the print data corresponding to the image confirmation use data is requested from the image forming apparatus, the selecting and outputting section selects print data except the data range for image confirmation use from the print data of predetermined unit stored in the print data storing section, and outputs the selected print data.

2. A printing system which is formed by a image processing apparatus to generate print data and a image forming apparatus to be connected with the image processing apparatus, to receive the print data and to execute a print, and prints a part of the print data before printing the print data of predetermined unit, comprising:
wherein the image forming apparatus includes
an image forming section which form an image on the basis of the print data received from the image processing apparatus;
a print mode discriminating section which discriminates whether the received print data is image confirmation use data;
a confirmation result inputting section which inputs a confirmation result of the image when the discriminated result of the print mode discriminating section is the image confirmation use data; and
a request informing section which requests the image process to output the print data to correspond to the inputted confirmation result in the confirmation result inputting section;
wherein the image processing apparatus includes
a print data generating section to generate print data of predetermined unit;
a print data storing section to store the generated print data; and
a selecting and outputting section to select a data range for the image confirmation and output the data of the data range;
wherein after the image confirmation use data is outputted to the image forming apparatus, when an output of the print data corresponding to the image confirmation use data is requested from the image forming apparatus, the selecting and outputting section outputs the print data of predetermined unit stored in the print data storing section.

3. The printing system according to claim 1,
wherein when the image forming apparatus is inputted a confirmation result indicating the formed image is not suitable through the confirmation result inputting section, the request informing section requests to stop the output of the print data with respect to the image processing apparatus, the image processing apparatus, when being requested to stop the output of the print data by the request informing section, deletes print data of predetermined unit stored in the print data storing section.

4. The printing system according to claim 2,
wherein when the image forming apparatus is inputted a confirmation result indicating the formed image is not suitable through the confirmation result inputting section, the request informing section requests to stop the output of the print data with respect to the image processing apparatus, the image processing apparatus, when being requested to stop the output of the print data by the request informing section, deletes print data of predetermined unit stored in the print data storing section.

5. The printing system according to claim 3,
wherein after the image forming apparatus printed the image confirmation use data, if the input of the confirmation result does not executed in the confirmation result inputting section over a predetermined time, the request informing section requests to stop the output of the print data with respect to the image processing apparatus.

6. The printing system according to claim 4,
wherein after the image forming apparatus printed the image confirmation use data, if the input of the confirmation result does not executed in the confirmation result inputting section over a predetermined time, the request informing section requests to stop the output of the print data with respect to the image processing apparatus.

7. The printing system according to claim 1,
wherein after the image forming apparatus printed the image confirmation use data, if the input of the confirmation result does not executed in the confirmation result inputting section over a predetermined time, the request informing section requests a confirmation input of the print data with respect to the image processing apparatus.

8. The printing system according to claim 2,
wherein after the image forming apparatus printed the image confirmation use data, if the input of the confirmation result does not executed in the confirmation result inputting section over a predetermined time, the request informing section requests a confirmation input of the print data with respect to the image processing apparatus.

9. The printing system according to claim 1,
wherein the image generating section, before generating the print data of the predetermined unit, generates print data in the data range for the image confirmation use.

10. The printing system according to claim 2,
wherein the image generating section, before generating the print data of the predetermined unit, generates print data in the data range for the image confirmation use.

11. The printing system according to claim 1,
wherein the image forming apparatus further includes a data storing section to store the image confirmation use data; and a print data selecting section to select one from the image confirmation use data stored in the data storing section and the print data outputted by the image processing apparatus based on an output request of print data requested by the request informing section according to the page order of the print data of the predetermined unit, wherein according to the page order, the image formation is performed.

12. The printing system according to claim 9, wherein the image forming apparatus further includes a data storing section to store the image confirmation use data; and a print data selecting section to select one from the image confirmation use data stored in the data storing section and the print data outputted by the image processing apparatus based on an output request of print data requested by the request informing section according to the page order of the print data of the predetermined unit, wherein according to the page order, the image formation is performed.

13. The printing system according to claim 1, wherein the image forming apparatus further includes a first sheet providing tray to accommodate record medium for forming image provided to the image forming section;

a second sheet providing tray to accommodate medium for executing a print based on the image confirmation use data;

a stacker to stack the record medium of the first sheet providing tray and the second sheet providing tray;

an outputting section to output the record medium of the first sheet providing tray or the second sheet providing tray to the stacker; and a tray selecting section to select the record medium outputted by the outputting section whether from the first sheet providing tray or the second sheet providing tray, the tray selecting section executes a selection so as to output the record medium according to a page order of the print data of the predetermined unit.

14. The printing system according to claim 1, further comprising:

a confirmation data setting section to set the data range for image conformation use in the print data of predetermined unit stored in the print data storing section.

15. The printing system according to claim 2, further comprising:

a confirmation data setting section to set the data range for image conformation use in the print data of predetermined unit stored in the print data storing section.

* * * * *

UNITED STATES PATENT AND TRADEMARK OFFICE
CERTIFICATE OF CORRECTION

PATENT NO. : 7,580,140 B2
APPLICATION NO. : 11/344022
DATED : August 25, 2009
INVENTOR(S) : Kazuya Yamamoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 878 days.

Signed and Sealed this

Fourteenth Day of September, 2010

David J. Kappos
*Director of the United States Patent and Trademark Office*